United States Patent [19]

Chilcote et al.

[11] Patent Number: 4,850,939
[45] Date of Patent: Jul. 25, 1989

[54] VARIABLE DIAMETER SPROCKET ASSEMBLY

[75] Inventors: Keith C. Chilcote, San Francisco; Robert J. Mahlowski, San Carlos, both of Calif.

[73] Assignee: Autra-Bike Co., Inc., San Francisco, Calif.

[21] Appl. No.: 112,225

[22] Filed: Oct. 21, 1987

[51] Int. Cl.$^4$ ............................................. F16H 55/54
[52] U.S. Cl. ...................................... 474/49; 474/50; 474/163
[58] Field of Search ...................... 474/47, 49, 50, 51, 474/53, 54, 163

[56] References Cited

U.S. PATENT DOCUMENTS

| | | | |
|---|---|---|---|
| 593,285 | 11/1897 | Van Eyck | 474/57 |
| 2,199,331 | 4/1940 | Carlsson | 474/47 |
| 2,827,797 | 7/1954 | Bell et al. | 474/49 |
| 3,798,989 | 3/1974 | Hunt | 474/49 |
| 3,800,613 | 4/1974 | Clark | 474/54 |
| 3,858,454 | 1/1975 | Duff | 474/163 X |
| 3,864,985 | 2/1975 | Bradley et al. | 74/125.5 |
| 3,867,851 | 2/1975 | Gregory et al. | 474/163 X |
| 3,956,944 | 5/1976 | Tompkins | 474/54 X |
| 3,969,948 | 7/1976 | Pipenhagen, Jr. | 474/50 |
| 4,129,044 | 12/1978 | Erickson et al. | 474/55 |
| 4,260,386 | 4/1981 | Frohardt | 474/72 |
| 4,487,085 | 12/1984 | Collins | 74/125.5 |
| 4,493,678 | 1/1985 | Husted | 474/164 |
| 4,498,351 | 2/1985 | Ahoor | 474/47 X |
| 4,608,034 | 8/1986 | Reswick | 474/49 |
| 4,772,250 | 9/1988 | Kovar | 474/47 |

FOREIGN PATENT DOCUMENTS 960014 4/1950 France ................................. 474/47

OTHER PUBLICATIONS

Daniel Sweeney, "Pedaling New Wares" *High Technology*, vol. 6, No. 2, Feb. 1986, pp. 54-55.
Brochure; James B. Reswich, "Ride-A-Matic," Automatic Bicycle Transmission, pp. 1-5.

*Primary Examiner*—Jerome W. Massie
*Assistant Examiner*—Matthew Smith
*Attorney, Agent, or Firm*—Knobbe, Martens, Olson & Bear

[57] ABSTRACT

A rotable sprocket assembly transmits force from a chain into rotation of a bicycle wheel. Sprocket segments having peripheral teeth are mounted on a pair of sprocket housings so that the combined periphery of the sprocket segments is substantially circular. The housings are stationary relative to each other and each is oriented in a plane which is normal to a central rotational axis. The sprocket segments are slidable relative to the housing in a radial direction so as to vary the diameter of the combined sprocket segments. Each sprocket segment is formed from a plurality of hinged subsegments, with each subsegment having a single tooth. The sprocket segments of one housing overlap the adjacent sprocket segments on the other housing so that the pairs of overlapping teeth combine to effectively form a single tooth. The sprocket segments are movable angularly relative to the sprocket housings, so that in combination with the radial displacement of the sprocket segments, the total number of effective teeth on the sprocket assembly can be varied in increments of one tooth. The sprocket segments are retained in a desired radial position by a disengageable latch mechanism. A shift actuator causes disengagement of the latch and angular displacement of the sprocket segments to a desired position. Movement of the shift actuator is accomplished manually or automatically through a motor and an electronic control system. The wheel and sprocket assembly permit removal of the wheel without requiring removal of the sprocket assembly.

38 Claims, 15 Drawing Sheets

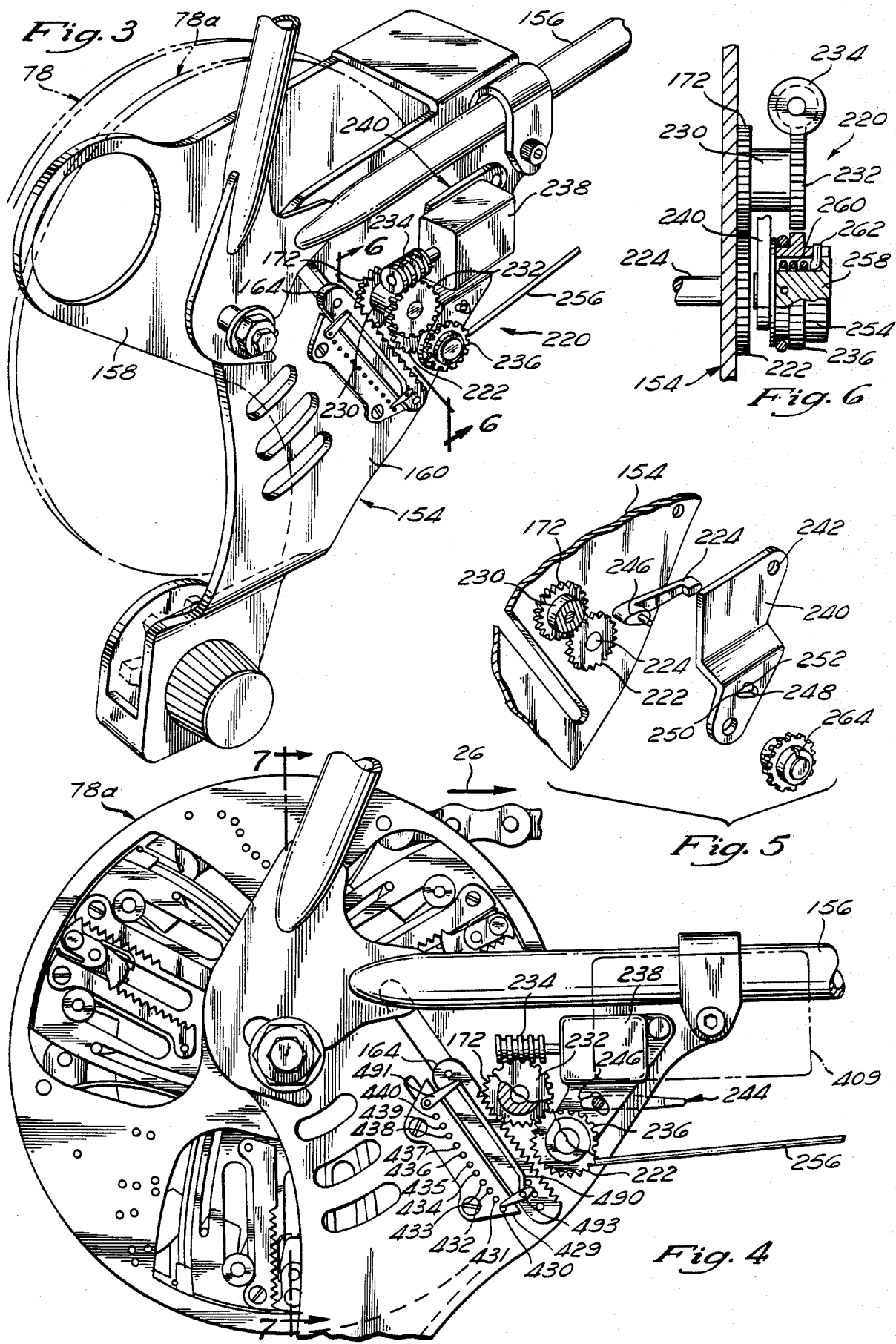

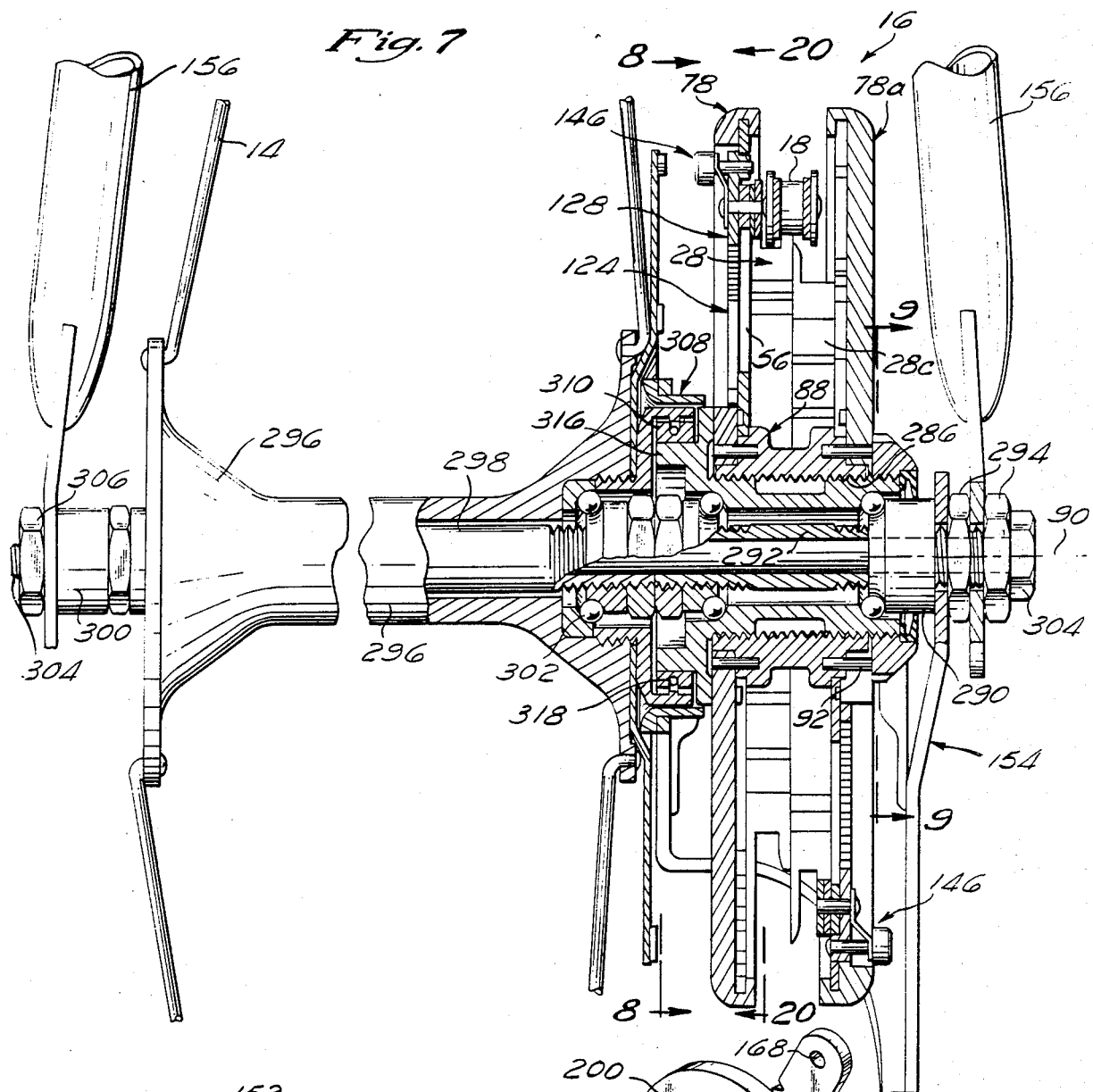
Fig. 7
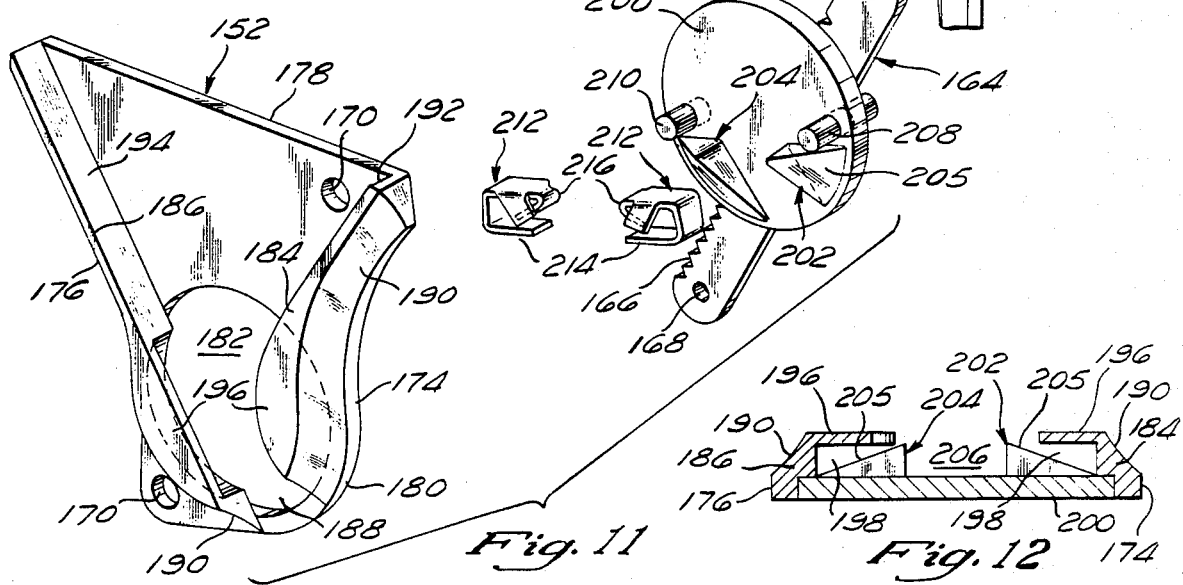
Fig. 11
Fig. 12

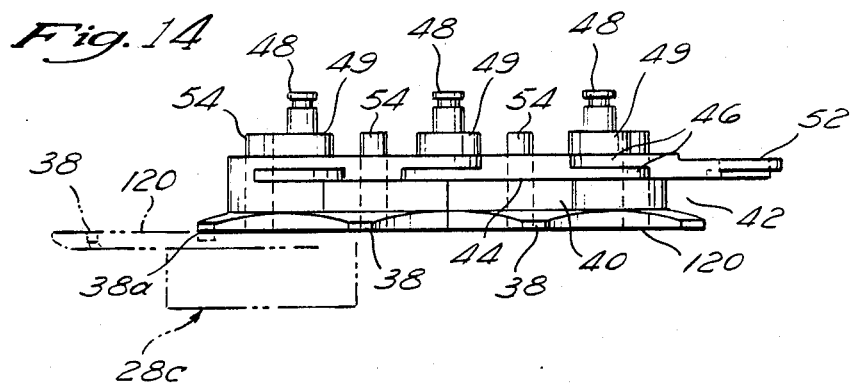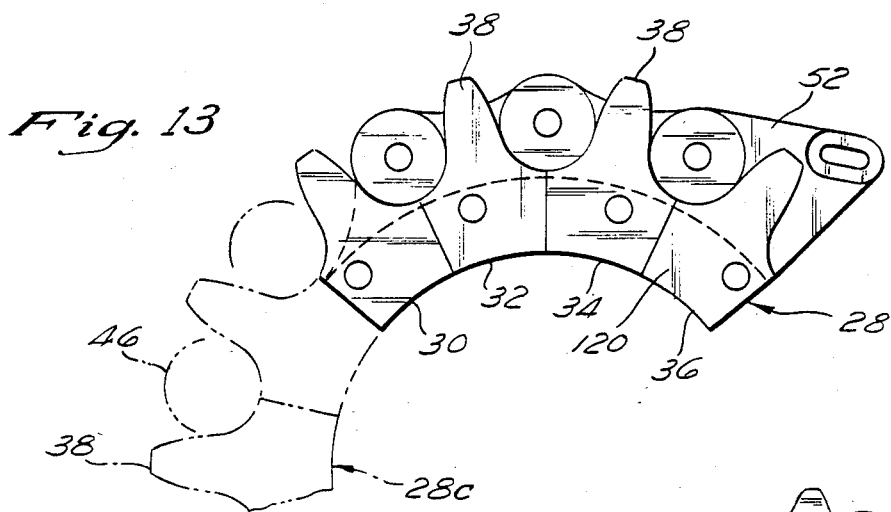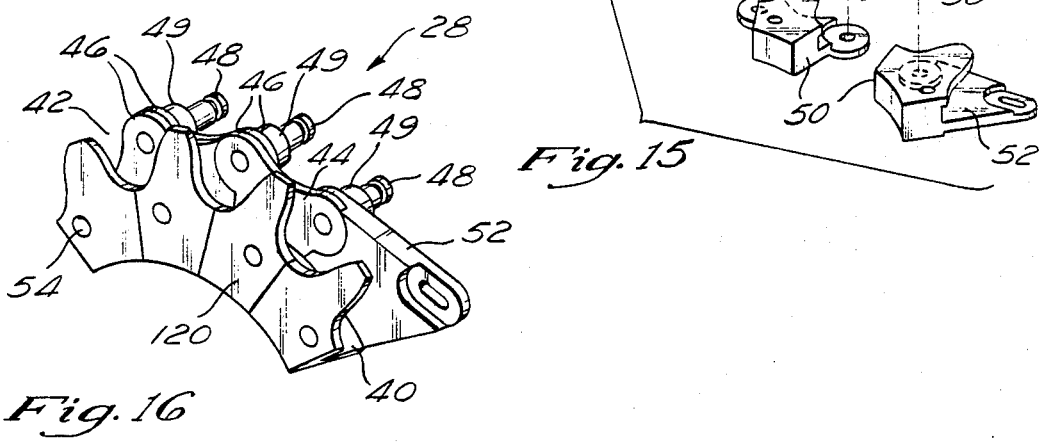

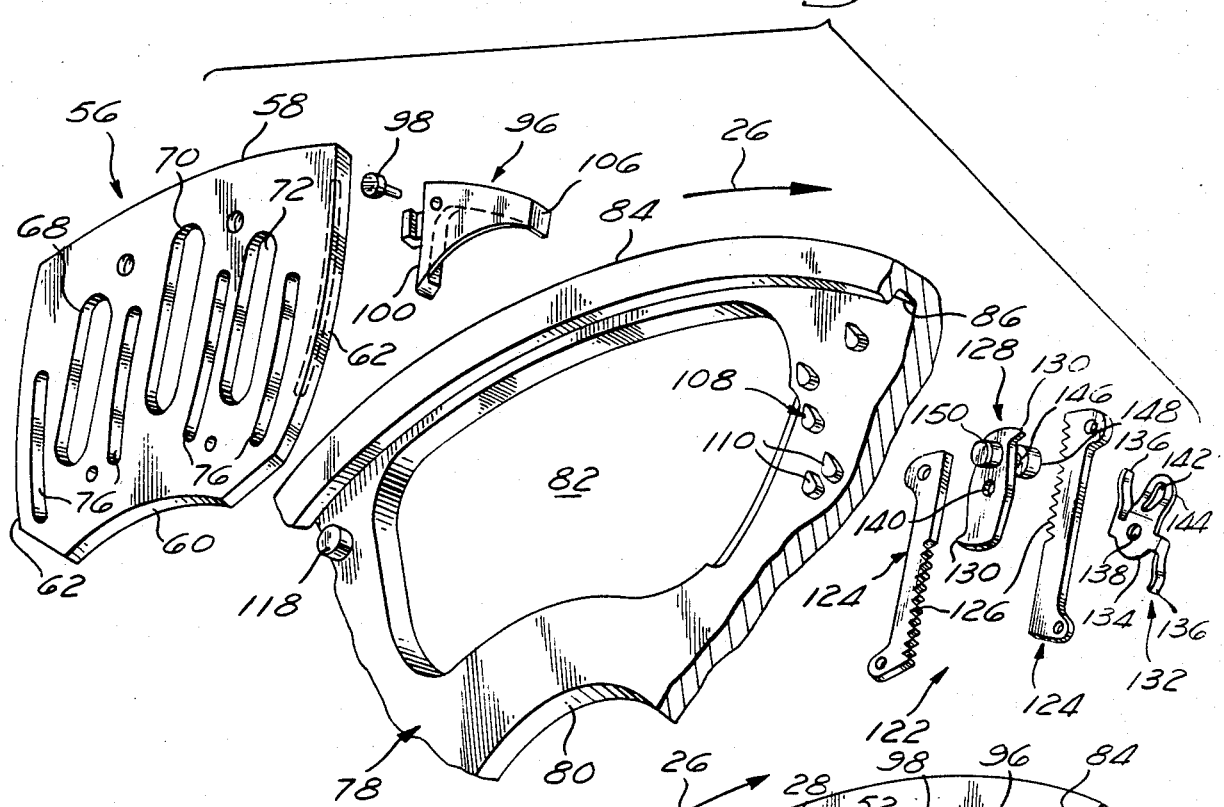
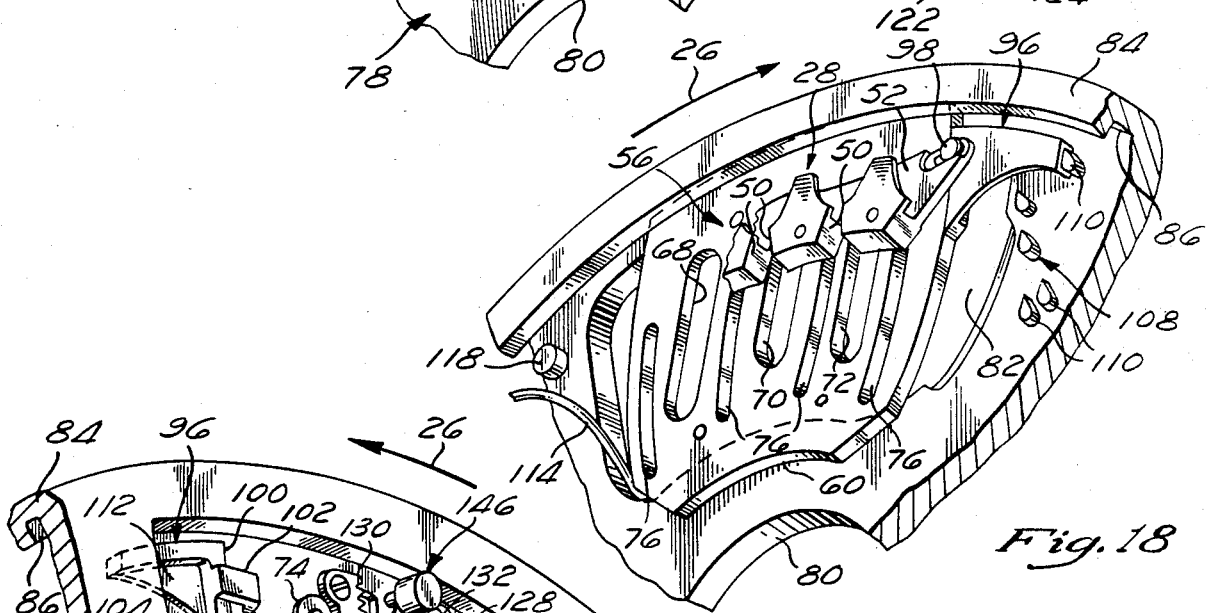
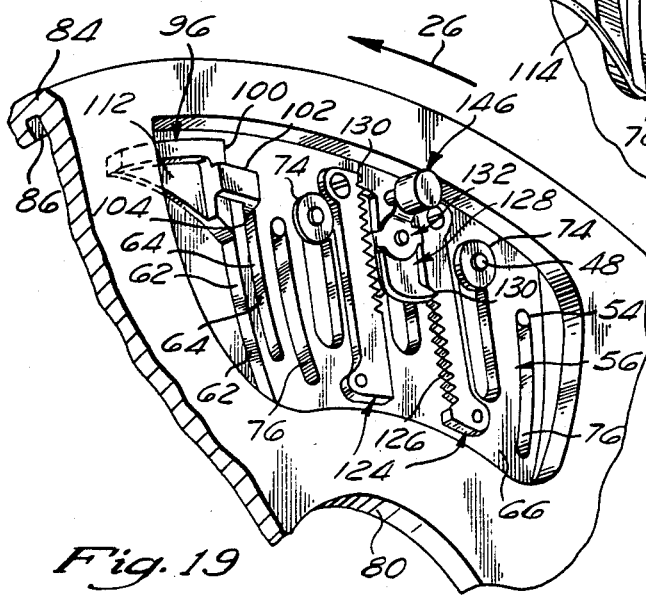

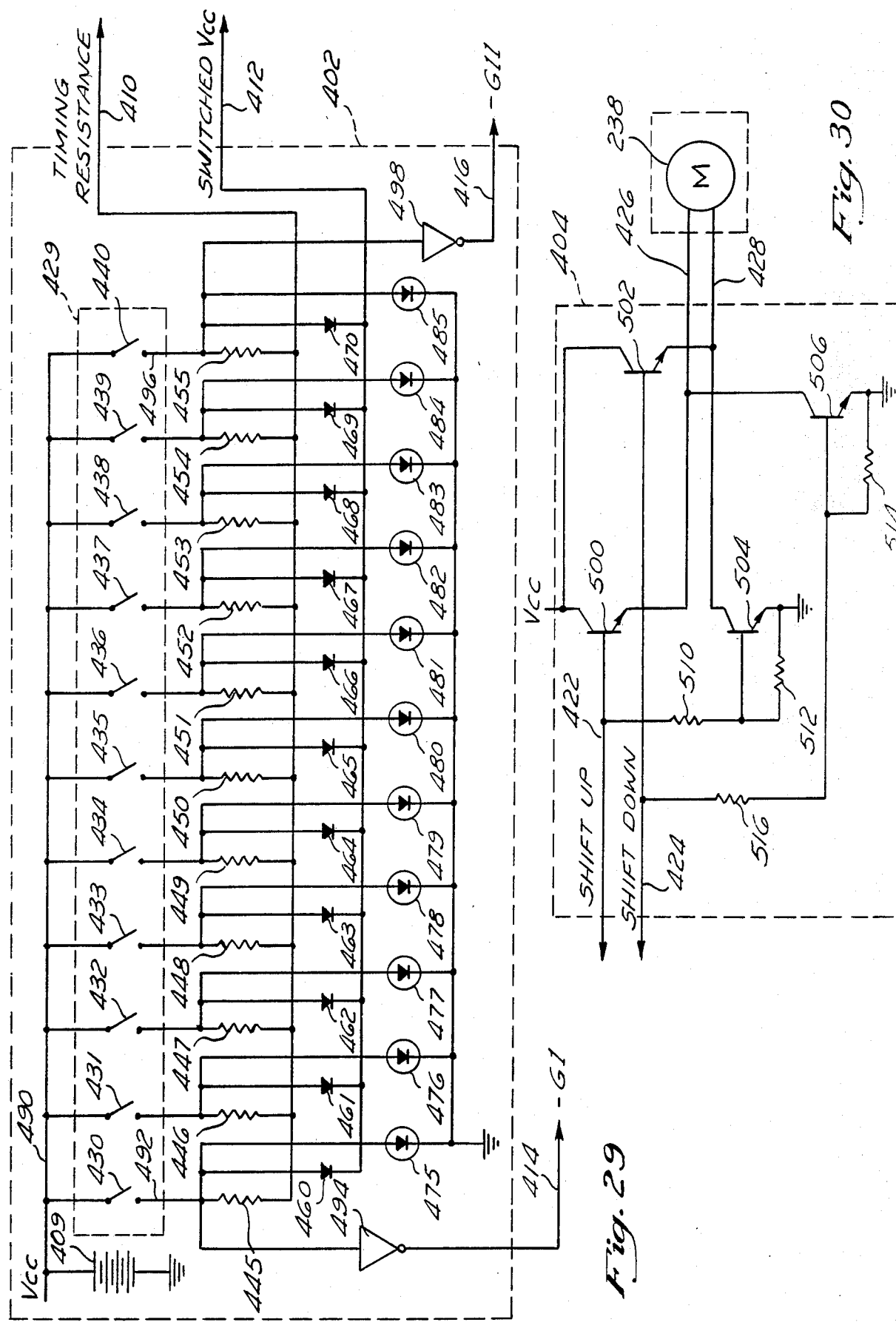

NO GEAR CHANGE

SHIFT UP SEQUENCE

Fig. 34  SHIFT DOWN SEQUENCE

TIMED OUT SHIFT UP SEQUENCE

VARIABLE DIAMETER SPROCKET ASSEMBLY

BACKGROUND OF THE INVENTION

The present invention relates to a sprocket assembly which has variable gear ratios, and, in particular, relates to a sprocket assembly which does not require a derailleur to change gears.

Although the primary mode of ground transportation is the automobile, the bicycle continues to be a popular mode of transportation, particularly for recreational purposes. One of the reasons that the bicycle maintains its popularity is the availability of bicycles having multiple gear ratios, for example, "10-speed" and "15-speed" models. While in higher gears, these bicycles enable a rider to obtain relatively high speeds, which is advantageous while traversing flat terrain or going downhill. Moreover, by shifting into lower gears, the rider can climb hills with relatively little effort.

The most common means for providing multiple gear ratios on a bicycle is a "derailleur." As is well known in the art, a derailleur system has a plurality of rear sprockets of varying diameters mounted proximate to and in driving engagement with the rear wheel of the bicycle. One or more front sprockets are typically mounted in so as to be driven by the pedal cranks. The periphery of each sprocket is provided with a plurality of teeth, the number of which vary with the diameter of the sprocket. A chain link drive chain meshes with the teeth and transmits power from a selected one of the front sprockets to a selected one of the rear sprockets.

To shift gears, the drive chain is moved from one sprocket to an adjacent sprocket to change the gear ratio between the front sprockets and the rear sprockets. Thus, the mechanical advantage applied to cause rotation of the rear wheel by the pedals is varied. Typically, a derailleur system will have five or six rear sprockets and two or three front sprockets. For example, a 10-speed bicycle will have two front sprockets and five rear sprockets. Similarly, a 15-speed bicycle will have three front sprockets and five rear sprockets.

Although the derailleur system is very popular and is adequate in most cases to provide the ability to shift between the available gear ratios, there are a number of inadequacies associated with the derailleur system that are familiar to anyone who has used such a system. For example, the drive chain must be physically moved laterally to shift the chain from one sprocket to an adjacent sprocket. To do this, the chain is physically pushed to one side during the shifting process to cause it to slip off one sprocket and onto the adjacent sprocket. Thus, during the shifting process, the chain is not aligned between the front driving sprocket and the rear driving sprocket. This misalignment causes wear on both the chain and the sprockets during the shifting process.

Another problem with exemplary derailleur systems is that the chain is not aligned between the front and rear sprockets for all gear ratios. For example, with many derailleur systems, it is not advisable to operate with the derailleur chain passing from the leftmost front sprocket to the rightmost rear sprocket, or from the rightmost front sprocket to the leftmost rear sprocket. During these operations, the chain is exerting lateral forces against the edges of the sprocket teeth, and can cause excessive wear.

Furthermore, it is preferable, if not necessary, that the shifting process occur when no heavy loads are present on the driving mechanism. For example, if a shift is initiated while the rider is exerting large forces on the drive mechanism while pedaling uphill, the wear on the chain and the sprockets will be increased substantially and there may be some difficulty in completing the shifting process.

Finally, the derailleur system only operates effectively when the bicycle is moving. For example, when the bicycle is standing still, the gear ratio on a derailleur system cannot be changed. If such an attempt is made, the derailleur will not operate properly upon resuming pedaling. Thus, it is necessary for a rider coming to a stop to anticipate the gear ratio required to resume motion and to downshift prior to stopping.

Other systems have been devised for providing variable gear ratios on bicycles. For example, U.S. Pat. No. 593,285 to Van Eyck, issued Nov. 9, 1897, shows an wheel that can be enlarged or reduced in size by means of a device located within reach of a bicycle rider. U.S. Pat. No. 2,827,797 to Bell, et al., issued on July 22, 1954, and U.S. Pat. No. 3,798,989 to Hunt, issued on March 26, 1974, show multiple-speed drive sprockets that can be varied from a circular configuration to an elliptical configuration. U.S. Pat. No. 3,800,613 to Clark, issued on April 2, 1974, shows a variable speed sprocket having a plurality of smaller sprockets that can be moved radially outward to vary the effective diameter of the sprocket group. U.S. Pat. No. 4,260,386 to Frohardt, issued on April 7, 1981, has an outer gear ring for engagement with a standard bicycle chain and having inner segments that can be adjusted to different configurations for driving the outer gear ring. U.S. Pat. No. 4,493,678 to Husted, issued on Jan. 15, 1985, has a plurality of sprocket segments that are movable inwardly and outwardly in a corresponding number of spiral-wavy-cams.

Although the above-listed patents appear to describe sprockets that maintain chain alignment at each of the gear ratios, none of the above-described patents appear to disclose a drive sprocket that remains substantially circular for each of the gear ratios. It is believed that substantial circularity is preferable in order to provide the smooth pedaling effect obtained when riding a typical bicycle having sprockets which remain circular. For example, the elliptical sprockets disclosed by the Bell and Hunt patents will provide a different effective gear ratio depending upon the angular positions of the pedals. Thus, the rider must apply varying effort as the pedals are rotated about the crank axis. This change in the gear ratio is frequently referred to as "chordal speed variation" and is caused by the deviation of the sprocket from a perfect circle. Even a conventional sprocket has a chordal speed variation of approximately 2 percent caused by the use of a linked chain rather than a smooth belt. For example, when engaged with a chain, a 27-tooth sprocket would effectively have 27 flat surfaces or chords forming its circumference, as opposed to a smooth, truly circular surface. The chordal speed variation of the Clark device will be substantial because of the significant difference in the distance of the chain from the axle of the wheel when the sprockets are tangential to the chain and when the sprockets are disposed at an angle to the chain.

Thus, a need exists for a drive sprocket that provides a variable gear ratio while maintaining substantial circularity of the driving sprocket.

Another drawback of the derailleur systems is that the shifting of gears is accomplished manually, by moving a lever. The lever typically actuates a cable, which in turn causes the derailleur to shift gears. Each time the gears are to be shifted, the rider must loosen his grip on the handlebar of the bicycle in order to manually actuate the lever. Thus, when travelling at high speeds or over irregular terrain, maintaining of directional control over the bicycle can be difficult while the gears are being changed.

Automatic transmissions have been developed which automatically change gears without requiring manual actuation. However, these previous devices, which operate mechanically, have been unsatisfactory due to loss of efficiency which results from the additional mechanical components that engage the drive chain and cause the rider to have to exert additional effort to operate the bicycle. Further, these prior devices cause gear changes upon sensing variation in the amount of torque applied to the drive chain by the rider. Since torque variations are common when the rider temporarily discontinues pedalling and is coasting, such as during turns or when going downhill, the prior transmissions will often cause unwanted gear changes during short lulls in the pedalling action of the rider. Thus, a need exists for an improved automatic transmission that does not require the rider to have to exert extra effort in order to overcome the loss of efficiency caused by mechanical automatic transmissions, and which shifts in accordance with the speed of the bicycle rather than the torque applied to the chain.

SUMMARY OF THE INVENTION

Briefly, the present invention is a sprocket assembly which is rotatable upon application of a force from a drive member which engages the sprocket assembly. The sprocket assembly is expandable so as to vary the mechanical advantage applied to the sprocket assembly. The sprocket assembly comprises a first sprocket housing which is rotatable about a central axis. The first sprocket housing is oriented in a plane which is substantially normal to the central axis. A second sprocket housing is also rotatable about the central axis, and is stationary relative to the first sprocket housing. The second sprocket housing is oriented in a plane which is parallel to the plane of the first sprocket housing. A plurality of sprockets segments are mounted on each of the sprocket housings. The sprocket segments include means for engaging the drive member so the motion of the drive member is transmitted into rotation of the sprocket assembly about the central axis. Each of the sprocket segments is movable relative to the housing on which it is mounted in a substantially radial direction. The sprocket segment on the first housing and the sprocket segment on the second housing cooperate to define a plurality of combined peripheral shapes, so as to permit variation in the mechanical advantage applied to the sprocket assembly by the drive member.

Preferably, the engagement means on the sprocket segments comprises a plurality of radially outwardly extending teeth, which mate with the drive member. The drive member, for example, may be formed from a chain comprised of a plurality of links.

A major advantage of the present invention over the prior art derailleur type systems is that no lateral movement of the chain is required to change gears. This is because the chain only engages a single sprocket throughout the variety of gear settings. Consequently, when the present invention is utilized as the rear sprocket on a bicycle, misalignment of the chain between the front and rear sprockets is minimal.

Another feature of the present invention is that regardless of the radial positions of the sprocket segments, the combined peripheral shape of the sprocket segments is substantially circular. To facilitate this, when the sprocket segments are in certain radial positions, the sprocket segments of one housing overlap with the adjacent sprocket segments on the other housing so that the pairs of overlapping teeth on the sprocket segments are effectively combined to form a single tooth. Moreover, each of the sprocket housings further comprises at least one backing plate on which the sprocket segments are slidably mounted. Preferably, arcuate slots are provided on each backing plate to guide the radial displacement of the sprocket segments. The backing plates are movable relative to the sprocket housings in an angular or circumferential direction only. Another advantage of the present sprocket assembly is that due to the combined radial and angular displacement of the sprocket segments relative to the sprocket housing, the diameter of the sprockets can be varied in small enough increments so that difference between consecutive sprocket settings is only a single tooth. Further, each sprocket segment is divided into a plurality of subsegments which are hingedly secured to each other. A single tooth is formed on each of the subsegments. As a result, a truly circular periphery can be obtained, thus virtually eliminating all chordal variation.

The present invention further comprises means for retaining the sprocket segments at desired locations relative to the sprocket housing. The retaining means is selectively disengageable so as to permit displacement of the sprocket segments to different locations, enabling the diameter of the sprocket segment to be varied. To change the diameter of the sprocket segment, a shift actuator is provided, which is movable relative to the central axis. Contact between the retaining means and the shift actuator causes disengagement of the retaining means and displacement of the sprocket segments, thereby causing the sprocket assembly to expand or contract. A shifter means is also provided to cause displacement of the shift actuator.

Advantageously, the shift actuator remains stationary during contact with the retaining means so that the force required to disengage the retaining means and displace the sprocket segments is not generated by moving the shift actuator, unlike derailleur-type shifters. The shifter means may be manually actuated to move the shift actuator, and thus the reduction in force necessary to move the shifter actuator enhances the ease of operation of the system. The force required to disengage the retaining means and cause displacement of the segments is generated by the chain, which, if used on a bicycle, is driven by the rider's legs, and thus the additional pedaling force required to shift gears is virtually unnoticeable. This is in contrast to prior device in which all of the force required is generated manually.

Another feature of the present invention is that the shift actuator can be moved while the sprocket assembly is stationary without adversely affecting the operation of the sprocket assembly upon resuming rotation. This results from orientating the shift actuator so that it contacts and disengages the retaining means at a position of angular rotation of the sprocket assembly wherein the drive chain is not engaged with the teeth of the sprocket segments of the sprocket assembly. This feature also permits shifting of gears while heavy loads are applied to the drive chain, such as while pedaling uphill, again without adversely affecting the changing of gears.

Furthermore, the number of rotations of the sprocket assembly required to cause shifting of multiple gears is no greater than the number of rotations of the sprocket assembly required to shift only a single gear, unlike previous derailleur systems. Another advantage is that the retaining means secures the sprocket segments in discrete locations corresponding to each gear ratio, and automatically compensates for movement of the shift actuator to a position which results in the sprocket segments being moved to positions other than the discrete gear positions.

Another aspect of the present invention is a hub assembly on which the wheel and sprocket assembly are rotatably mounted and secured to the bicycle frame. The sprocket assembly is rotatable about a tubular sprocket axle which is secured at one end to the bicycle frame. The wheel is rotatable about a tubular wheel axle, which has a common central axis with the sprocket axle. One end of the wheel axle is secured to the bicycle frame and the other end of the wheel axle is positioned opposite the other end of the sprocket axle. An elongate inner axle member extends through the wheel axle and through the sprocket axle and is fastened at either end to the bicycle frame. A clutch is provided to transmit force from the sprocket assembly to the wheel, and is disengageable so that upon withdrawal of the axle member from the wheel and sprocket axles, the clutch means can be disengaged to permit the wheel to be removed from the bicycle frame, without requiring removal of the sprocket assembly.

Another aspect of the present invention is a device that automatically controls the gear selection of a multigear shifting mechanism of a bicycle. The device comprises an electric motor that is engageable with the shifting mechanism. The rotation of the electric motor causes the shifting mechanism to shift from one gear to another gear. The motor is operational in a first direction to cause the shifting mechanism to select a higher gear. The motor is operational in a second direction to cause the shifting mechanism to select a lower gear. The device further includes a transducer that generates an output signal that has a characteristic that varies in accordance with the rotation rate of one of the wheels of the bicycle. An electrical circuit is also included that receives the transducer output signal and that generates a motor power signal to operate the electric motor. The electrical circuit compares the characteristic of the transducer output with first and second ranges of characteristics for the currently selected gear. The electrical circuit generates a motor power signal with a first polarity to operate the electric motor in the first direction to select a higher gear when the transducer output is within the first range of characteristics. The electrical circuit generates the motor power signal with a second polarity to operate the electric motor in the second direction to select a lower gear when the transducer output is within the second range of characteristics.

In preferred embodiments of the device the characteristic is the time interval between successive pulses generated by the transducer. The electrical circuit includes a pulse generator that generates a pulse having a time duration that varies in accordance with the currently selected gear. In a preferred embodiment of the device, the time duration is selected by a plurality of timing resistors, one of the timing resistors corresponding to each gear selection provided by the shifting mechanism. A counter is also included that counts the number of pulses generated by the transducer during the time duration and that provides a count output corresponding to the number of pulses. The preferred embodiment of the device also includes a decoder that decodes the count output of the counter and that generates a first signal when the count output is within a first range of counts. The decoder also generates a second signal when the count output is within a second range of counts.

BRIEF DESCRIPTION OF THE DRAWINGS

FIG. 3 is a perspective view of the sprocket assembly shown in FIG. 2, with a dust cover removed to expose the shifter transmission, and with the sprocket housings shown schematically.

FIG. 4 is a side elevation of the sprocket assembly shown in FIG. 3, with the sprocket housing shown in detail.

FIG. 5 is an exploded perspective view of the shifter transmission shown in FIGS. 3 and 4.

FIG. 6 is a cross-sectional view of the shifter transmission shown in FIG. 3, as taken along line 6—6.

FIG. 7 is a cross-sectional view of the present sprocket assembly and the rear wheel of a bicycle, and their associated hub assemblies.

FIG. 11 is an exploded perspective view of the shift actuator mechanism shown in FIG. 9.

FIG. 12 is a cross-sectional view of the shift actuator mechanism shown in FIG. 9, taken along line 12—12.

FIG. 13 is a side elevation of a sprocket segment, with an overlapping sprocket segment shown schematically in broken lines.

FIG. 14 is a top plan view of the sprocket segments shown in FIG. 13.

FIG. 15 is an exploded perspective view of a sprocket segment.

FIG. 16 is a perspective view of a sprocket segment.

FIG. 17 is an exploded perspective view of a sprocket housing, a backing plate and a shift lock mechanism.

FIG. 18 is a perspective view of a portion of a sprocket housing, a backing plate and a portion of a sprocket segment mounted thereon, as viewed from the interior of the, sprocket assembly.

FIG. 19 is a perspective view of a portion of a sprocket housing, a backing plate and a shift lock mechanism, as view from the exterior of the sprocket assembly.

FIG. 29 is a detailed schematic diagram of the timing select and gear-indicating circuit, showing the plurality of switches representing the switch contacts of FIG. 4, the switch-selected timing resistors, the SWITCHED Vcc line and the light-emitting diodes that indicate the currently selected gear.

FIG. 30 is a detailed schematic diagram of the motor drive circuit that is responsive to the SHIFT-UP and SHIFT-DOWN signals from the motor controller circuit and that generates a bidirectional motor power signal that drives the electric motor in one of two directions.

DETAILED DESCRIPTION OF A PREFERRED EMBODIMENT

Figure 1:
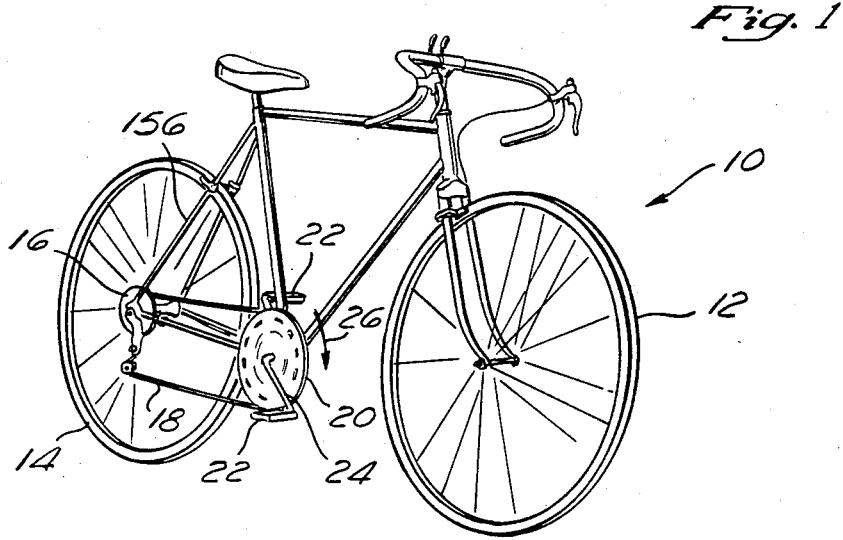
FIG. 1 is a perspective view of a bicycle utilizing the present variable diameter sprocket assembly on the rear wheel of the bicycle.

Referring to FIG. 1, a bicycle 10 having a front wheel 12 and a rear wheel 14 is shown. A sprocket assembly 16 according to the present invention is rotatably mounted adjacent the rear wheel 14. An endless chain 18 is looped around the sprocket assembly 16 and also around a rotatable front sprocket 20. Rotation of the front sprocket 20 is caused by applying force to a pair of pedals 22 joined to the front sprocket 20 by means of pedal cranks 24. Rotation of the front sprocket 20 in turn moves the chain 18 in a clockwise direction indicated by arrow 26, and referred to herein as the "drive direction." Movement of the chain 18 in the drive direction 26 results in rotation of the sprocket assembly 16. The sprocket assembly 16 is joined to the rear wheel 14 in a manner so that rotation of the sprocket assembly 16 is transferred into rotation of the rear wheel 14, as is discussed in greater detail below.

FIGS. 14–16 illustrate a sprocket segment 28 which is provided on the sprocket assembly 16 to engage the chain 18. The sprocket segment 28 is formed from a group of four separate subsegments 30, 32, 34, 36 which are hingedly secured together so that the sprocket segment 28 can assume an overall arcuate curvature. Each subsegment 30, 32, 34, 36 has a substantially planar tooth 38 which protrudes radially outward and is designed to mesh with the chain 18. Adjacent each tooth 38 is a shelf 40 which forms the base of a channel 42 within which the chain 18 nests when engaging the teeth 38. The opposite side of the channel 42 is formed by a planar hinge plate 44 which is substantially parallel to the plane of the teeth 38.

Each hinge plate 44 includes at least one circular hinge connector 46 which is recessed so as to mate with the hinge connector 46 of the adjacent subsegment. A hinge pin 48 extends through aligned holes in the hinge connectors 46 of adjacent subsegments 30, 32, 34, 36 to pivotably secure the subsegments 30, 32, 34, 36 together. The mating circular peripheries of the hinge connectors 46 permit rotation of the subsegments 30, 32, 34, 36 relative to each other throughout a range of angular displacement. Consequently, the overall radius of curvature of the sprocket segment 28 can be varied by pivotal movement of the subsegments 30, 32, 34, 36 relative to each other. The minimum radius or diameter of the sprocket segment 28 is reached when there is contact between side edges 50 of the subsegments 30, 32, 34, 36. The side edges 50 are tapered in a radially inward direction so as to increase the degree of curvature which can be achieved by the sprocket segment 28 when the adjacent side edges 50 are abutting.

Each of the four subsegments 30, 32, 34, 36 differ slightly. The left, outer subsegment 30 has only a single hinge connector 46 since it is only adjacent to one other subsegment 32, which is referred to as the left central subsegment 32. Both the left central subsegment 32 and the adjacent right central subsegment 34 have two hinge connectors 46 on either side. The right outer subsegment 36 has a hinge connector 46 on one side to secure the right outer subsegment 36 to the right central subsegment 34. A locator contact plate 52 also extends outwardly from the other side of the right outer subsegment 36. The purpose of the locator plate 52 is discussed in greater detail below. Each subsegment 30, 32, 34, 36 also includes a guide pin 54 which extends outwardly in a direction substantially parallel to the direction of the hinge pins 48.

Figure 20:
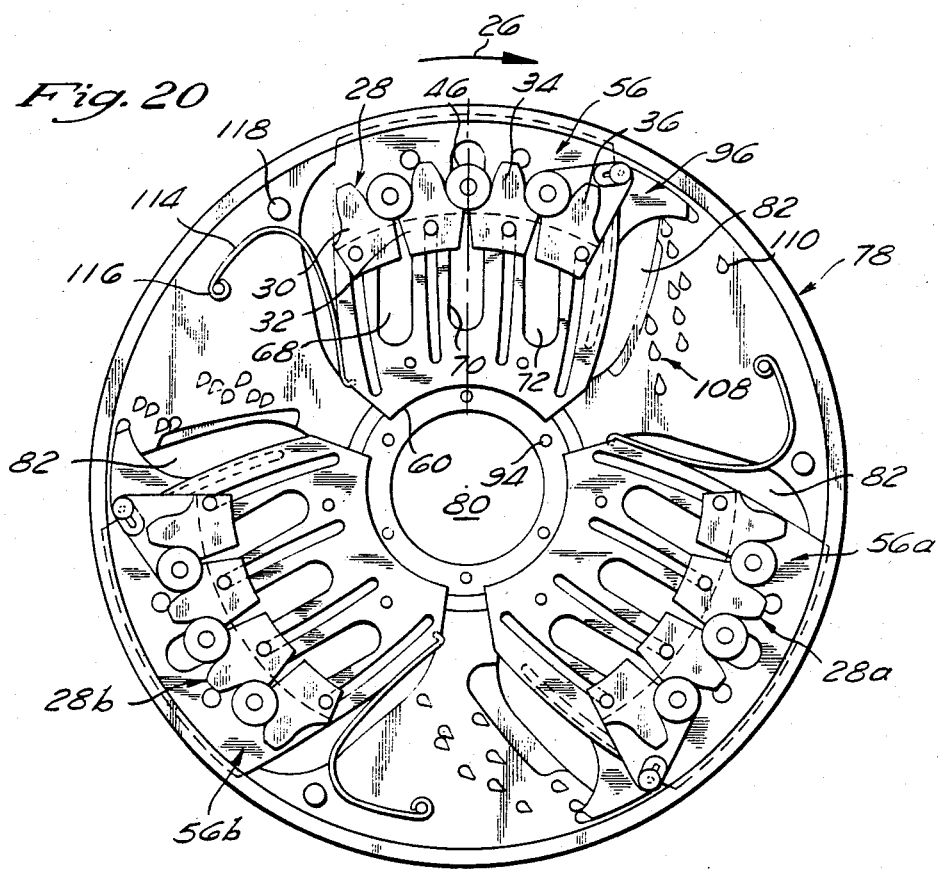
FIG. 20 is a side elevation of the inboard sprocket housing with the sprocket segments positioned in first gear.
Figure 21:
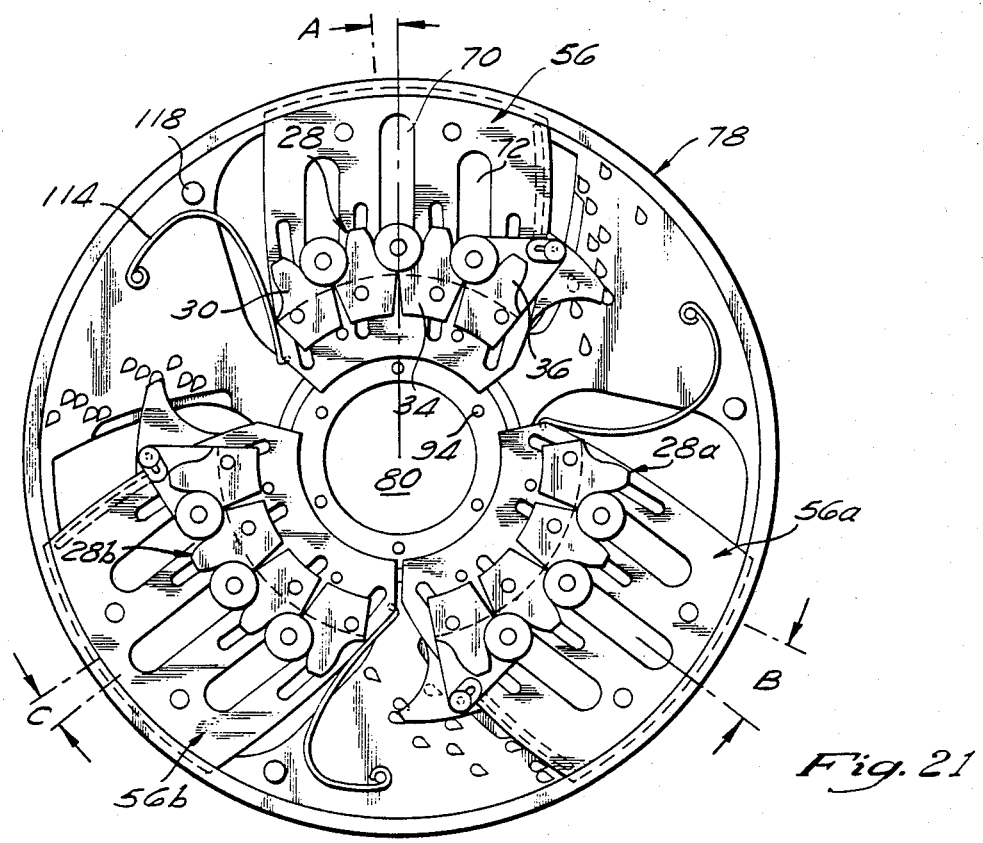
FIG. 21 is a side elevation of the inboard sprocket housing with the sprocket segments positioned in eighth gear.

As is shown in FIGS. 18, 20 and 21, the sprocket segment 28 is mounted on a substantially planar backing plate 56. The backing plate 56 has an arcuate radially outer edge 58, an arcuate radially inner edge 60 and a pair of convexly curved side edges 62. As is seen in FIGS. 17 and 19, a groove 64 is provided on a back side 66 of the backing plate 56. The groove 64 is curved and extends substantially parallel to the curved side edge 62.

Three oblong hinge pin slots 68, 70, 72 extend completely through the backing plate 56. The hinge pins 48 extend through and are slidable within the hinge pin slots 68, 70, 72. Preferably, the hinge pins 48 are surrounded by tubular rollers 49 which reduce friction between the pins 48 and the backing plate 56. To secure the sprocket segment 28 to the backing plate 56, washers 74 are secured to the ends of the hinge pins 48 which extend through the back side 66 of the backing plate 56.

Additionally, a total of four guide pin slots 76 are provided in the backing plate 56. The guide pin slots 76 are narrower than the hinge pin slots 68, 70, 72 and are interspersed between the hinge pin slots 68, 70, 72 so that each hinge pin slot 68, 70, 72 is surrounded on either side by a guide pin slot 76. The guide pins 54 on the sprocket segment 28 extend into and are slidable within the guide pin slots 76.

The curvature of the guide pin slots 68, 70, 72 and the hinge pin slots 76 is chosen so that as the sprocket segment 28 slides along the backing plate 56, the radius of curvature of the sprocket segment 28 varies. However, the sprocket segment 28 always forms a truly circular arc about the same center point regardless of its position relative to the backing plate 56. By curving the guide pin slots 76 and the outer hinge pin slots 68, 72 as circular arcs of a large radius, the sprocket segment 28 can maintain a truly circular arc over the range of sprocket segment 28 radii permissible by sliding along the backing plate 56.

As is described more fully below, the sprocket segment 28 can be held stationary relative to the backing plate 56 at a number of discrete locations corresponding to desired sprocket radii. Each of these positions is referred to as a "gear," due to the different gear ratios or degree of mechanical advantages between the front sprocket 20 and the sprocket assembly 16.

As seen in FIGS. 7 and 17-21, the backing plate 56 is slidably mounted on an annular sprocket housing 78, along with two identical backing plates 56a and 56b. On each backing plate 56, 56a, 56b, an identical sprocket segment 28, 28a, 28b is mounted, respectively. The sprocket housing 78 is substantially planar and has a circular central bore 80 and three equally-spaced cutout portions 82 between the bore 80 and a peripheral lip 84 the sprocket housing 78. The peripheral lip 84 on the sprocket housing defines a radially inwardly facing channel 86. The outer edges 58 of the backing plates 56 are slidable within the channel 86.

Referring to FIG. 7, a sprocket hub 88 extends through the central bore 80. The hub 88 is rotatable about a central axis 90, but is fixed relative to the sprocket housing 78 by means of pins 92 which extend through holes 94 in the sprocket housing surrounding the central bore 80. The radially inner edges 60 of the backing plates 56 slidably rest on the hub 88. As a result, the backing plates 56 cannot be displaced radially relative to the sprocket housing 78, but are capable of angular displacement or rotation about the central axis 90.

The angular displacement of the backing plates 56 in the drive direction 26 is limited by a polar locator 96. The polar locator 96 is pivotably joined to the locator plate 52 on the right outer sprocket subsegment 36 by means of a pin 98, and is slidable relative to the backing plate 56 along with the entire sprocket segment 28. The polar locator 96 has a concavely curved radial edge 100 which abuts against the side edge 62 of the backing plate 56. An arm 102 extends outwardly from the polar locator radial edge 100 and terminates in a lip 104 which faces inwardly and mates with the groove 64 in the backside 66 of the backing plate 56, so as to guide the motion of the polar locator 96 relative to the backing plate 56.

A substantially planar pin engagement surface 106 on one end of the polar locator 96 abuts against one of several locator pins 108 protruding from the sprocket housing 78. The locator pins 108 are positioned adjacent one side of each cutout 82. A planar contact surface 110 on each of the locator pins 108 mates with the polar locator surface 106 so as to prevent further angular displacement of the backing plates 56 in the drive direction 26. A number of locator pins 108 are provided in varying angular and radial positions so that for each radial position of the sprocket segments 28 corresponding to a "gear," the polar locator 96 will be in contact with a different locator pin 108. A depression 112 is provided on the backside of the polar locator 96 so that the polar locator 96 can overlap and avoid contact with adjacent locator pins 108 not corresponding to the desired "gear."

Figure 25:
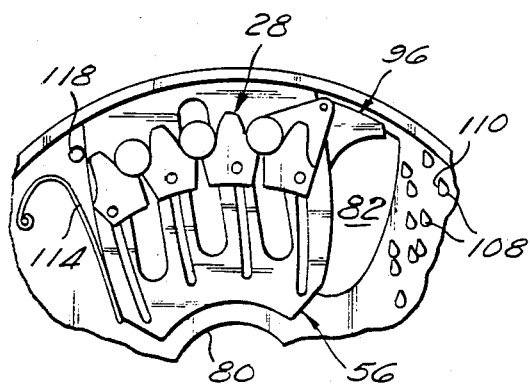
FIG. 25 is a schematic view of a portion of a shifter housing with a backing plate and a sprocket segment biased to the left side during the initiation of gear shifting.

The backing plate 56 is biased in the drive direction 26 by means of a spring 114 so that the polar locator 96 is normally in engagement with the locator pins 108. The spring 114 is fixed at one end to a pin 116 on the sprocket housing 78 and at another end engages the side edge 62 of the backing plate 56. Any displacement of the backing plate 56 in a direction opposite the drive direction 26 is limited by a stop member 118 which protrudes from the sprocket housing 78 adjacent each cutout, and engages the side edge 62 of the backing plate 56 so as to prevent further angular displacement of the backing plate 56 in a direction opposite the drive direction 26, as is best shown in FIG. 25.

As illustrated in FIGS. 20 and 21, the three backing plates 56, 56a, 56b are mounted on the sprocket housing 78 so as to overlap each of the three cutout portions 82 on the sprocket housing 78. Correspondingly, springs 114, stop members 118 and locator pins 108 are positioned proximate each cutout, so that each backing plate 56, 56a, 56b and the sprocket segments 28, 28a, 28b mounted thereon are movable independently of each other. The sprocket segments 28, 28a, 28b do not form a continuous periphery due to gaps or spaces between each of the segments 28, 28a, 28b.

The sprocket housing 78 shown in FIGS. 20 and 21 is one of two sprocket housings 78, 78a on the sprocket assembly 16. As is shown in FIG. 7, a second or "outboard" sprocket housing 78a is oriented in a plane substantially parallel to the plane of the "inboard" sprocket housing 78, shown in FIG. 20. As used herein, the term "inboard" refers to the side of the sprocket assembly 16 adjacent to the rear wheel 14, and "outboard" refers to the side of the sprocket assembly 16 facing outwardly, or away from the rear wheel 14.

The outboard sprocket housing 78a is fixed to the sprocket hub 88 in the same manner as the inboard sprocket housing 78 and thus the sprocket housings 78, 78a are stationary relative to each other. With the exception of the exact positioning of the locator pins 108, the outboard sprocket housing 78a is the mirror image of the inboard sprocket housing 78. The outboard sprocket housing 78a has three sprocket segments 28c mounted thereon. The outboard sprocket housing 78a is secured to the sprocket hub 88 at an angular orientation such that the cutouts 82 on the outboard sprocket housing 78a are staggered 60° relative to the cutouts 82 on the inboard sprocket housing 78. As a result, the sprocket segments 28c of the outboard sprocket housing 78a are positioned to fill in the gaps between sprocket segments 28, 28a, 28b of the inboard sprocket housing 78. The combined peripheries of the outboard housing sprocket segments 28c and the inboard housing sprocket segments 28, 28a, 28b therefore form a continuous periphery. Preferably, the periphery of the sprocket segments 28, 28a, 28b, 28c is circular in shape.

By sliding the sprocket segments 28 radially inwardly relative to the backing plates 56, the diameter of the sprocket assembly 16 is reduced, thereby "changing gears" or varying the mechanical advantage applied to the sprocket assembly 16 by the chain 18. As the diameter of the sprocket assembly 16 is reduced, the total number of teeth 38 on the sprocket assembly 16 must also be reduced, since the continuous periphery of the reduced diameter sprocket assembly 16 is correspondingly less.

The required reduction in the number of teeth 38 is achieved by permitting overlap of the inboard housing sprocket segments 28, 28a, 28b with the outboard housing sprocket segments 28c, as in FIGS. 13 and 14, where one of the three outboard housing sprocket segments 28c is shown in broken lines. The teeth 38 on each sprocket segment 28 are approximately one-half the width of a standard-size sprocket tooth, and thus the overlapping teeth 38 combine to effectively form a single, standard-width tooth 38a. The sprocket segments 28 each have planar front surfaces 120 which abut each other during overlap. Although FIGS. 13 and 14 only show the overlap of a single tooth 38 on each sprocket segment 28, 28c, it is to be understood that the total number of overlapping teeth 38 may be greater in order to permit the overall diameter of the sprocket assembly 16 to be further reduced.

To ensure that the sprocket segments 28 overlap the precise degree required for pairs of teeth 38 to be properly aligned and form a single tooth 38a, the backing plates 56 are displaced angularly and maintained in the proper angular position by the polar locator 96 and the locator pins 108. As mentioned above, for each "gear" or sprocket assembly diameter, a different locator pin 108 is provided at a radial position corresponding to the radial position of the sprocket segment 28 for that particular gear. Additionally, the angular displacement of each backing plate 56 varies for each gear, as is necessary to achieve the proper overlapping of teeth 38 on adjacent sprocket segments 28. Further, for a given gear or radial position of the sprocket segments 28, each of the six backing plates 56 located on both the inboard and outboard housings 78, 78a will have its own particular degree of angular displacement.

This is illustrated in FIG. 20, which shows the inboard sprocket housing 78 with the sprocket segments 28 positioned in their most radially outward position to form the largest diameter sprocket possible, which corresponds to "first gear." In this position, each backing plate 56 is centered relative to the cutouts 82, such that the centers of the backing plates 56, 56a, 56b are exactly 120° apart.

FIG. 21 illustrates the inboard housing 78 with the sprocket segments 28 displaced radially inwardly such that, due to overlap with the sprocket segments 28c of the outboard housing 78a, the total number of effective teeth 38 on the sprocket 16 are seven teeth less than that in first gear. Since the diameter of the sprocket assembly 16 can be varied in increments small enough so that the total number of teeth 38 on the sprocket assembly 16 is changed by only a single tooth, the sprocket segment position shown in FIG. 21 corresponds to the seventh incremental step from the first position shown in FIG. 20. Therefore, the position shown in FIG. 21 is referred to as "eighth gear," as one would add the seven incremental steps to the first gear.

When in eighth gear, the backing plates 56 are not oriented exactly 120° apart. The angular displacement A corresponds to a 3.53 degree displacement for the backing plate 56 from its position when in first gear. The angular displacement B corresponds to a 10.59 degree displacement from the backing plate 56a position in first gear, and the angular displacement C corresponds to a 3.53 degree displacement of the backing plate 56b from a position in first gear. Each of the three backing plates 56 has a different angular displacement due to the different angular position of the particular locator pin 108 which each backing plate 56 is positioned by when the sprocket assembly 16 is in eighth gear. Likewise, the locator pins 108 on the outboard housing 78a are different for each of the three backing plates 56 mounted on the outboard housing 78a.

In the preferred embodiment, the angular offset of each sprocket segment 28 from its centered position (120° apart from the other sprocket segments 28 on the same sprocket housing, 78, 78a) is listed in the table below, for each of the gear positions of the sprocket assembly 16. Also listed in the table are the number of total effective teeth 38 on the sprocket assembly 16 for each gear position. In the table, sprocket segments Nos. 1, 3 and 5 are those sprocket segments located on the inboard housing 78, and sprocket segments Nos. 2, 4 and 6 are those sprocket segments located on the outboard housing 78a. A positive value for the number of degrees of offset indicates that the sprocket segment 28 is rotated in the drive direction 26 relative to the center position, whereas a negative offset indicates that the rotation is counter to the drive direction 26.

| | SPROCKET SEGMENT OFFSET | |
|---|---|---|
| Gear No. | OFFSET IN DEGREES (Drive Direction 26 Positive) | Sprocket Segment No. |
| Gear: 11 | 0 | 1 |
| No. of Teeth: 14 | −8.57 | 2 |
| | +8.57 | 3 |
| | 0 | 4 |
| | −8.57 | 5 |
| | +8.57 | 6 |
| Gear: 10 | +6.00 | 6 |
| No. of Teeth: 15 | −6.00 | 1 |
| | +6.00 | 2 |
| | −6.00 | 3 |
| | +6.00 | 4 |
| | −6.00 | 5 |
| Gear: 9 | 0 | 5 |
| No. of Teeth: 16 | +7.50 | 6 |
| | −7.50 | 1 |
| | 0 | 2 |
| | +7.50 | 3 |

-continued
SPROCKET SEGMENT OFFSET

| Gear No. | OFFSET IN DEGREES (Drive Direction 26 Positive) | Sprocket Segment No. |
|---|---|---|
|  | −7.50 | 4 |
| Gear: 8 | 0 | 6 |
| No. of Teeth: 17 | +3.53 | 1 |
|  | +7.06 | 2 |
|  | +10.59 | 3 |
|  | −7.06 | 4 |
|  | −3.53 | 5 |
| Gear: 7 | 0 | 3 |
| No. of Teeth: 18 | 0 | 4 |
|  | 0 | 5 |
|  | 0 | 6 |
|  | 0 | 1 |
|  | 0 | 2 |
| Gear: 6 | 0 | 6 |
| No. of Teeth: 19 | −3.16 | 1 |
|  | −6.32 | 2 |
|  | +9.47 | 3 |
|  | +6.32 | 4 |
|  | +3.16 | 5 |
| Gear: 5 | 0 | 1 |
| No. of Teeth: 20 | −6.00 | 2 |
|  | +6.00 | 3 |
|  | 0 | 4 |
|  | −6.00 | 5 |
|  | +6.00 | 6 |
| Gear: 4 | +4.28 | 6 |
| No. of Teeth: 21 | −4.28 | 1 |
|  | +4.28 | 2 |
|  | −4.28 | 3 |
|  | +4.28 | 4 |
|  | −4.28 | 5 |
| Gear: 3 | 0 | 5 |
| No. of Teeth: 22 | +5.45 | 6 |
|  | −5.45 | 1 |
|  | 0 | 2 |
|  | +5.45 | 3 |
|  | −5.45 | 4 |
| Gear: 2 | 0 | 4 |
| No. of Teeth: 23 | +2.61 | 5 |
|  | +5.22 | 6 |
|  | +7.83 | 1 |
|  | −5.22 | 2 |
|  | −2.61 | 3 |
| Gear: 1 | 0 | 3 |
| No. of Teeth: 24 | 0 | 4 |
|  | 0 | 5 |
|  | 0 | 6 |
|  | 0 | 1 |
|  | 0 | 2 |

To secure the sprocket segments 28 at the desired radial position corresponding to each gear, a shift lock mechanism 122 is provided with each sprocket segment 28. As is best shown in FIGS. 4, 17 and 19, the shift lock mechanism 122 is comprised of a pair of racks 124 which are secured to the backside 66 of each backing plate 56. The racks 124 are generally elongate and planar, and are oriented substantially parallel to the central hinge pin slot 70 in the backing plate 56. The two racks 124 on each backing plate 56 are oriented substantially parallel to each other, and are positioned on either side of the central hinge pin slot 70. On the edges of the racks 124 which face toward each other, a plurality of small teeth 126 are provided. The teeth 126 are designed to mate with a latch member 128 which is pivotably secured to the hinge pin 48 which extends through the central hinge pin slot 70. The latch member 128 has an overall S-shape, formed by a pair of catch members 130 protruding outwardly from opposite sides of either end of the latch member 128. The catches 130 are designed to mate with the teeth 126 in the racks 124. Since the catch members 130 are positioned on opposite sides of the latch 128, both catches 130 can be simultaneously engaged with the teeth 126 on both racks 124. When the catches 130 are so engaged with the racks 124, the sprocket segments 28 are held in a stationary radial position.

The latch member 128 is biased into an engaged position with the racks 124 by means of a shift lock spring 132. The shift lock spring 132 has a body portion 134 which is mounted on the latch member 128 and a pair of arms 136 which extend outwardly from the body portion 134. The arms 136 engage the inwardly facing edges of the racks 124 so as to force the catch members 130 into the teeth 126 on the racks 124. The body portion 134 of the spring 132 is secured to the latch member 128 through a central hole 138 which aligns with a central hole 140 in the latch member 128, through which the hinge pin 48 extends.

The spring 132 is also secured to the latch member 128 through an elongated opening 142 which passes through a raised portion 144 of the spring 132. A pilot pin 146 extends through the elongated hole 142 in the spring 132, and also through an aligned hole in the latch member 128. The pilot pin 146 is slidable through the hole in the latch member 128, but is maintained captive on the latch member 128 by means of an enlarged head 148 on one end of the pin 146 and a shoulder 150 on the other end. Both the head 148 of the pilot pin 146 and the shoulder 150 of the pilot pin 146 are larger in diameter than the hole through which the pilot pin 146 is slidable. Likewise, the pilot pin head 148 is larger than the elongated hole 142 in the spring 132, and thus retains the spring 132 on the latch member 130.

The bent or raised portion 144 of the spring 132 biases the pilot pin 146 in a direction away from the back side 66 of the backing plate 56, so that the shoulder portion 150 of the pilot pin 146 is normally abutting against the latch member 128.

Since the pilot pin 146 extends through the latch member 128 at a point spaced from the center of the latch member 128, and since the latch member 128 is pivotable about its center, applying a force to the pilot pin 146 in a direction opposite the drive direction 26 will cause the latch member 128 to rotate about its center. Consequently, the latch member 128 will become disengaged from the teeth 126 on the racks 124, permitting radial motion of the latch member 128 relative to the backing plate 56. Since the latch member 128 is directly secured to the sprocket segments 28 which are on the other side of the backing plates 56, when the latch member 128 is permitted to move radially, the sprocket segments 28 will also be permitted to move radially. Likewise, when the catches 130 of the latch member 128 are in engagement with the racks 124, radial motion of the latch member 128 and the sprocket segments 28 is prevented.

The teeth 126 on the racks 124 are designed so that each tooth 126 corresponds to one of the gears of the sprocket assembly 16. Thus, moving the latch member 128 radially so as to displace the catch members 130 by a single tooth 126 along the rack 124 results in the changing of gears by an increment of a single discrete gear ratio.

In order to disengage the latch members 128 and permit radial motion of the sprocket segments 28, and therefore gear shifting, a shift actuator 152 is provided to contact the pilot pin 146 as is needed to disengage the latch members 128. The shift actuator 152 is best shown in FIGS. 8, 9, 11 and 12. The shift actuator 152 has a generally U-shaped outline and is mounted to a shifter housing 154, which is best illustrated in FIG. 3. The shifter housing 154 is mounted on the bicycle frame 156 and has two substantially planar side walls 158 and 160, which are parallel to each other and which surround the inboard and outboard sides of the sprocket assembly 16, respectively.

Two shift actuators 152, 152a, outboard and inboard, are provided, one secured to each side wall 160, 158, respectively. An elongate shift actuator slot 162 is provided in each side wall 160, 158. The shift actuator 152, 152a is mounted on the interior side of the side Walls 160, 158, or the sides which face toward the sprocket assembly 16. On the opposite or exterior side of each side wall 160, 158 a shifter rack 164 is provided. The shifter racks 164 are generally elongate and has a plurality of teeth 166 along one side edge. The shifter rack 164 is pinned to the shift actuator 152 through holes 168 in the shifter rack 164 which align with holes 170, in the shift actuator 152. The holes 168, 170 are also aligned with the actuator slot 162. The shift actuator 152 and the shifter rack 164 are slidable relative to the shifter housing side wall 158, 160 along the actuator slot 162. Simultaneous movement of the shift actuators 152, 152a is caused by rotation of a pinion gear 172 which engages the shifter racks 164, as discussed in greater detail below.

With reference to the axis of rotation 90 as the radial center point, the shift actuator 152 has a radially inner edge 174 which is generally S-shaped, and a radially outer edge 176 which likewise is S-shaped. A linear upper edge 178 joins the upper ends of the radial edges 174, 176. An arcuate lower edge 180 joins the lower ends of the radial edges 174, 176 and surrounds a circular bore 182 which extends through the lower portion of the shift actuator 152. A raised inner shoulder 184 conforms to the radially inner edge 174 of the shift actuator 152. Likewise, a raised outer shoulder 186 wraps around the radially outer edge 176 of the actuator 152. The shoulders 184, 186 do not extend across the upper edge 178, and are separated along a portion of the lower edge 180 of the actuator so as to create a gap 188. The shoulders 184, 186 each include a beveled surface 190 which slopes downwardly and outwardly, toward the respective radial edges 174, 176 of the actuator 152. The inwardly facing sides of the shoulders 184, 186 are defined by planar contact surfaces 192, 194 which extend normally from the actuator 152. The contact surface 194 on the outer shoulder 186 is substantially linear, while the inner contact surface 192 is convexly curved. The sections of the shoulders 184, 186 which overlay the bore 182 are countersunk so as to define planar shelves 196 which cover small depressions or pockets 198.

A circular base plate 200 having a diameter proximate to that of the bore 182 is inserted within the bore 182. The base plate 200 abuts against the shoulders 184, 186 and is rotatable relative the actuator 152. A pair of triangular, wedge-shaped deflectors 202, 204 protrude upwardly from the base plate 200 and nest within the pockets 198 in the actuator 152. Both of the deflectors 202, 204 have surface 205 that slope downwardly toward the periphery of the base plate 200 from a high point at their apexes. The space between the deflectors 202, 204 defines a channel 206 which is aligned with the gap 188 between the shoulders 184, 186. A pair of cylindrical spring pins 208, 210 extend from the base plate 200 from points just above the deflectors 202, 204. One of the spring pins 208 is elongated and extends completely through the base plate 200 and protrudes from the rear side thereof. Mounted on each of the spring pins 208, 210 is a contact spring 212 which includes a leg 214 that extends between the deflectors 202, 204 and spring pins 208, 210. A V-shaped section of each spring 212 extends inwardly, terminating at a contact point 216.

Figure 9:
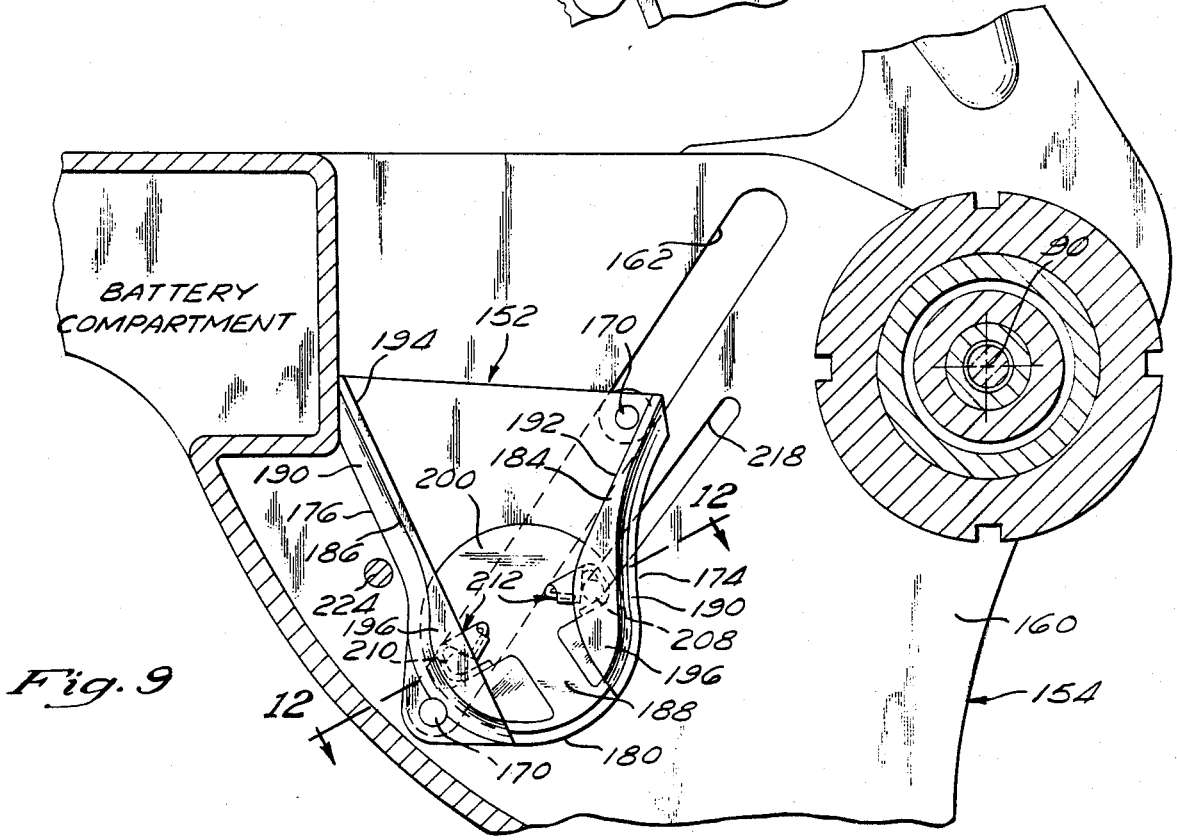
FIG. 9 is a cross-sectional side elevation of the sprocket assembly shown in FIG. 7, as taken along line 9—9, illustrating the inboard side of the shifter housing and the shift actuator.

As is best shown in FIG. 9, the elongated spring pin 208 extends through an elongate spring pin slot 218 on the shifter housing 154. The spring pin slot 218 is slightly arcuate, having a large radius of curvature. The spring pin slot 218 is also skewed relative to the actuator slot 162 so that the slots 162, 218 diverge as they extend upwardly and in a generally radially inward direction. Thus, as the shift actuator 152 and the base plate 200 slide radially inwardly, the base plate 200 will rotate in a clockwise direction relative to the actuator 152 due to the fact that the spring pin 208 is captured within the spring pin slot 218.

Figure 22:
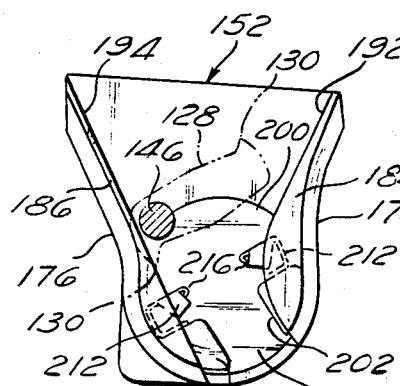
FIG. 22 is a side elevation of a shift actuator and a pilot pin as/engaged during gear shifting.
Figure 24:
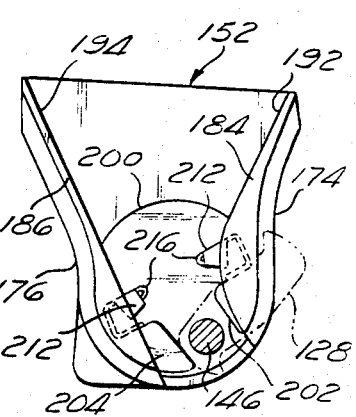
FIG. 24 is a side elevation of a shift actuator and a pilot pin after the completion of gear shifting.
Figure 26:
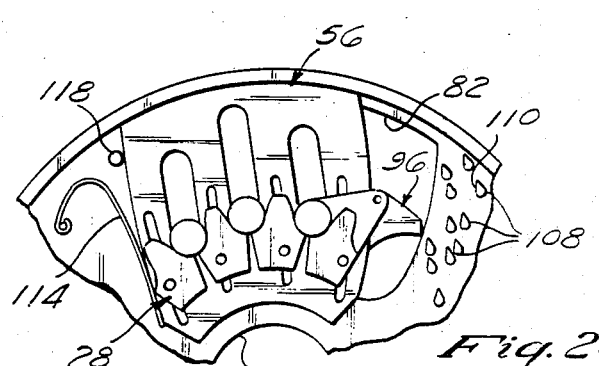
FIG. 26 shows the assembly of FIG. 25 after the sprocket segment has been moved radially to a new position corresponding to a new gear.

FIGS. 22 and 24 best illustrate the outboard shift actuator 152 and base plate 200 in operation. FIG. 22 shows the outboard shift actuator 152 in a stationary position, just after it has been moved in a radially inward direction. As the sprocket assembly 16 rotates, the pilot pins 146 on the outboard sprocket housing 78a will consecutively engage the contact surface 194 on the radially outer shoulder 186 of the shift actuator 152. The engagement between the pilot pin 146 and the contact surface 194 initially causes angular displacement of the entire backing plate 56 on which the pilot pin 146 is secured, as shown in FIG. 25. The displacement of the backing plate 56 is terminated upon contact of the backing plate 56 with the stop pin 118. At this time, the engagement between the pilot pin 146 and the contact surface 194 causes deflection of the arms 136 on the shift lock spring 132 and rotation of the latch member 128 about the hinge pin 48. This sequence of movement described is due to the greater stiffness of the shift lock spring 132 as compared to the backing plate spring 114. Rotation of the latch member 128 disengages the catch members 130 from the catch racks 124 (FIG. 19), permitting radial displacement of the sprocket segments 28 relative to the backing plate 56, as illustrated in FIG. 26.

Figure 23:
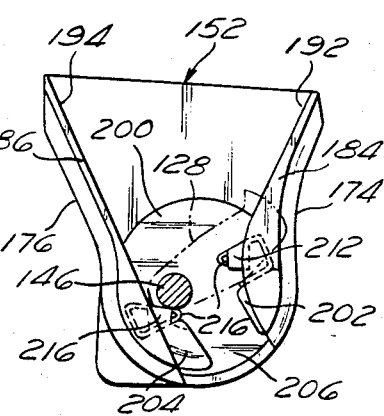
FIG. 23 is a side elevation of a shift actuator showing engagement between the pilot pin and the contact spring during gear shifting.

Continued rotation of the sprocket assembly 16 brings the pilot pin 146 into engagement with the contact spring 212, as is shown in FIG. 23. The contact spring 212 will deflect until it contacts the deflector 204. The deflection of the contact spring 212 guides the pilot pin 146 so as to be displaced radially inwardly a small distance beyond that which would occur if the contact point 216 on the spring 212 were to remain in its undeflected position. Thus, in subsequent revolutions of the sprocket assembly 16, the pilot pin 146 will not engage the undeflected contact spring 212 or the contact surface 194, as long as the shift actuator 152 remains stationary.

Figure 27:
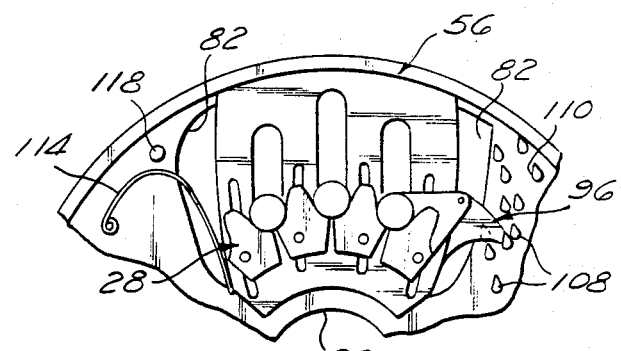
FIG. 27 shows the assembly of FIG. 26 after completion of gear shifting.

FIG. 24 shows the pilot pin 146 after further rotation and disengagement of the pilot pin 146 from the contact spring 212. At this point, the latch member 128 is biased back into engagement with the rack 124 by the shift lock spring 132, and the backing plate 56 is biased by the spring 114 to return to an angular position in which the polar locator 96 is in contact with the locator pin lot, as shown in FIG. 27. The pilot pin 146 then passes through the channel 206, avoiding further contact with the shift actuator 152.

The shifting sequence described above is repeated for each of the three sprocket segments 28c on the outboard housing 78a. Since, as discussed below, both shift actuators 152, 152a move simultaneously, the sprocket segments 28 on the inboard sprocket housing 78 will simultaneously be moved to the same radial position or gear setting as the outboard sprocket segments 28c. Thus, a gear shift will be completed after one full revolution of the sprocket assembly 16 during which each of the six pilot pins 146 on the sprocket assembly 16 will be engaged by the shift actuators 152, 152a. As a result, gear shifts need not take place incrementally, i.e., the shift actuator 152 may be moved to a position which causes a change in the diameter of the sprocket assembly 16 such that shifting across multiple gear ratios may take place even though only a single movement of the shift actuator 152 has occurred.

When the shift actuator 152 is moved in a radially inward direction, the diameter of the sprocket assembly 16 will be reduced, or there will be a shift to a higher gear. Conversely, displacement of the shift actuator 152 in a radially outward direction will cause shifting to a lower gear by increasing the diameter of the sprocket assembly 16. Although not shown, shifting to a lower gear is caused by engagement of the pilot pins 146 with the radially inner contact surface 192 and with the inner contact spring 212, in a similar sequence to that discussed above with FIGS. 22-25.

The rotation of the base plate 200 as the shift actuator 152 is moved along the slots 162, 218 is necessary to maintain both of the spring pins 208, 210 oriented so that both spring pins 208, 210 and the central axis 90 are collinear. Thus, movement of the shift actuator 152 along the actuator slot 162, which is not in a truly radial direction, still permits the contact springs 212 to be deflected in a manner which radially displaces the pilot pins 146 further than would occur if the contact points 216 on the contact springs 212 were stationary. Thus, regardless of the position of the shift actuator 152, the pilot pins 146 will always be moved to a position in which, after shifting is completed, the pilot pins 146 will not engage the shift actuator 152 or the undeflected contact springs 212 on subsequent revolutions.

Since the actual displacement of the sprocket segments occurs while the shift actuator 152 is stationary, the force required to move the actuator 152 is small. The energy required to move the sprocket segments 28 by contact between the pilot pins 146 and the shift actuator 152 is derived from the energy supplied to the sprocket assembly 16 by the chain 18. This energy is in turn provided by the rider's legs, and is negligible in comparison to the total force applied to the sprocket assembly 16 by the chain 18.

Figure 8:
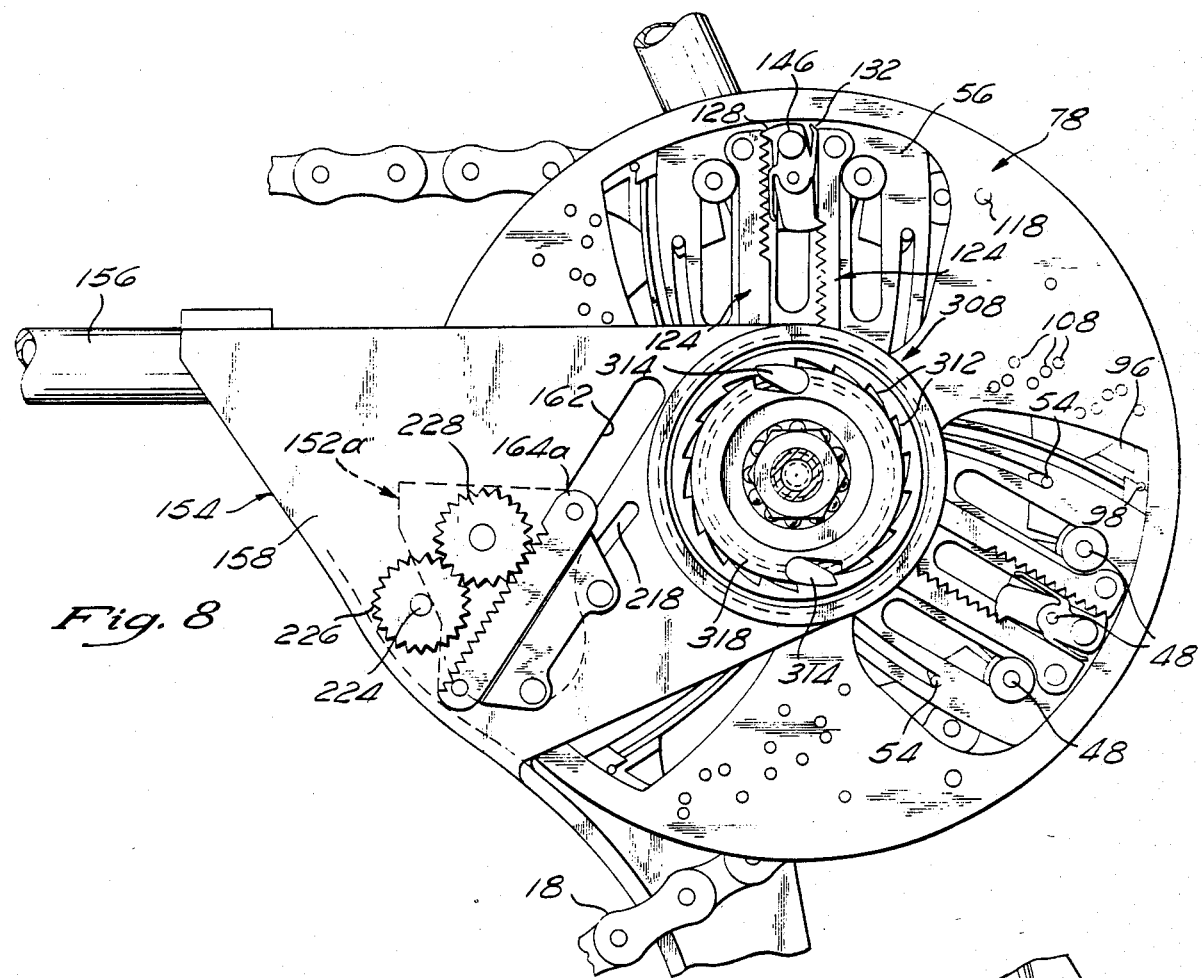
FIG. 8 is a cross-sectional side elevation of the inboard side of the present sprocket assembly, as taken along line 8—8, in FIG. 7.

Moreover, as is best seen in FIG. 8, the chain 18 wraps around less than 180° of the sprocket assembly 16. The shift actuators 152, 152a are oriented alongside the sprocket assembly 16 at a point on the circumference of the sprocket assembly 16 which never is in engagement with the chain 18. As a result, gear shifting can be conducted while high loads are applied to the sprocket assembly 16, or even when pedaling from a complete stop, without adversely affecting the function of the sprocket assembly 16 or its gear shifting.

The beveled surfaces 190 on the shoulders 184, 186 and the deflectors 202, 204 are designed to permit backpedaling, or rotation of the sprocket assembly 16 in a direction opposite to the drive direction 26. After the completion of a gear shift, all of the pilot pins 146 are radially positioned so that during regular pedaling and even during backpedaling, the pilot pins 146 would pass through the channel 206 in the base plate 200 without interference. However, in the event that a gear shift is not completed, i.e., some but not all of the pilot pins 146 have been moved to a position at which the pilot pins 146 would pass through the channel 206, upon backpedaling, the pilot pins 206 which had not yet been repositioned would engage either the deflectors 202, 204 or the shoulders 184, 186.

However, the pilot pins 146 are capable of axial displacement upon deflection of the raised portion 144 of the shift lock spring 132, and contact between the pilot pins 146 and the sloped surfaces 190, 205 of the deflectors 202, 204 or the shoulders 184, 186 will cause such axial displacement. As a result, the pilot pins 146 will pass over the shift actuator 152 smoothly, without interfering with the backpedaling motion.

Turning now to FIGS. 3-6, a transmission 220 which causes movement of the shift actuators 152, 152a is illustrated. As discussed above, a pinion gear 172 is rotatably mounted on the outboard side wall 160 of the shifter housing 154 and meshes with the shifter rack 164 so that rotation of the pinion gear 172 causes linear motion of the rack 164 and the outboard shift actuator 152, which is fixed to the rack 164. The pinion gear 172 also drives an outboard transfer gear 222 which is mounted on a transfer shaft 224 that extends through both side walls 160, 158 of the shifter housing 154, and terminates at an inboard transfer gear 226 which is flush against the inboard side wall 158. The inboard transfer gear 226 drives an adjacent inboard pinion gear 228 which in turn meshes with an inboard shifter rack 164a, as seen in FIG. 8. Consequently, rotation of the pinion gear 172 causes simultaneous motion of both shift actuators 152, 152a.

The pinion gear 172 is flush against the side wall 160 and is mounted on a pinion hub 230, which extends normal to the plane of the outboard side wall 160. An outer gear 232 is mounted on the free end of the pinion hub 230 so that the driving forces applied to the outer gear 232 are transmitted through the pinion hub 230 through the pinion gear 172. Preferably, a driving force can be applied in one of two ways to the outer gear 232: (1) by means of a worm gear 234, or (2) by means of a manual control gear 236.

FIGS. 3, 4 and 6 illustrate the transmission 220 with the outer gear 232 being driven by the worm gear 234, which in turn is rotated by an electric motor 238. The motor 238 is fixed on a mounting plate 240 which has a generally triangular outline and is pivotably secured to the outboard side wall 160 of the shifter housing 154 through a hole 242 on an upper apex of the mounting plate 240. The mounting plate 240 is prevented from rotation by a lever 244 which is pivotably secured to the outboard side wall 160, and has a raised portion 246 which protrudes through an opening 248 in the mounting plate 240. The opening 248 has a curved cam surface which forms two lobes 250, 252 in the opening 248. When the raised portion 246 of the lever 244 engages the lower lobe 250, the worm gear 234 engages the outer gear 232. By rotating the lever 244, pivotal movement of the mounting plate 240 is caused, until the upper lobe 252 is engaged by the lever 244. The resulting movement of the mounting plate 240 disengages the worm gear 234 and brings the manual control gear 236 into engagement with the outer gear 232.

As is best seen in FIG. 6, the manual control gear 236 is formed on the periphery of a tubular take-up reel 254 around which a cable 256 is wrapped. The take-up reel 254 is rotatable about a shaft 258 which extends through the take-up reel 254 and is fixed to the mounting plate 240. A coiled return spring 260 wraps around the shaft 25 and terminates at an arm 262 which is engaged in a slot 264 in the take-up reel 254. The return spring 260 thus biases the take-up reel 254 to rotate in a clockwise direction, which causes the cable 256 to be wound around the take-up reel 254. This also applies a tension to the cable 256 which additionally acts to bias the mounting plate 240 to rotate in a counter clockwise direction, causing a positive engagement between the raised portion 246 of the lever 244 and the lobes 250, 252 of the opening 248.

By moving the lever 244, the rider can optionally switch between a manual transmission mode in which the manual control gear 236 provides the force to move the shift actuator 152 and change gears, and an automatic transmission mode in which the gear shifting is initiated by rotation of the worm gear 234 through action of the electric motor 238. The operation of the electric motor 238 is controlled by a control circuit shown in FIG. 10. The operations of the control circuit to provide automatic shifting of the gear ratio in response to changes in road conditions will be set forth in more detail below.

Figure 2:
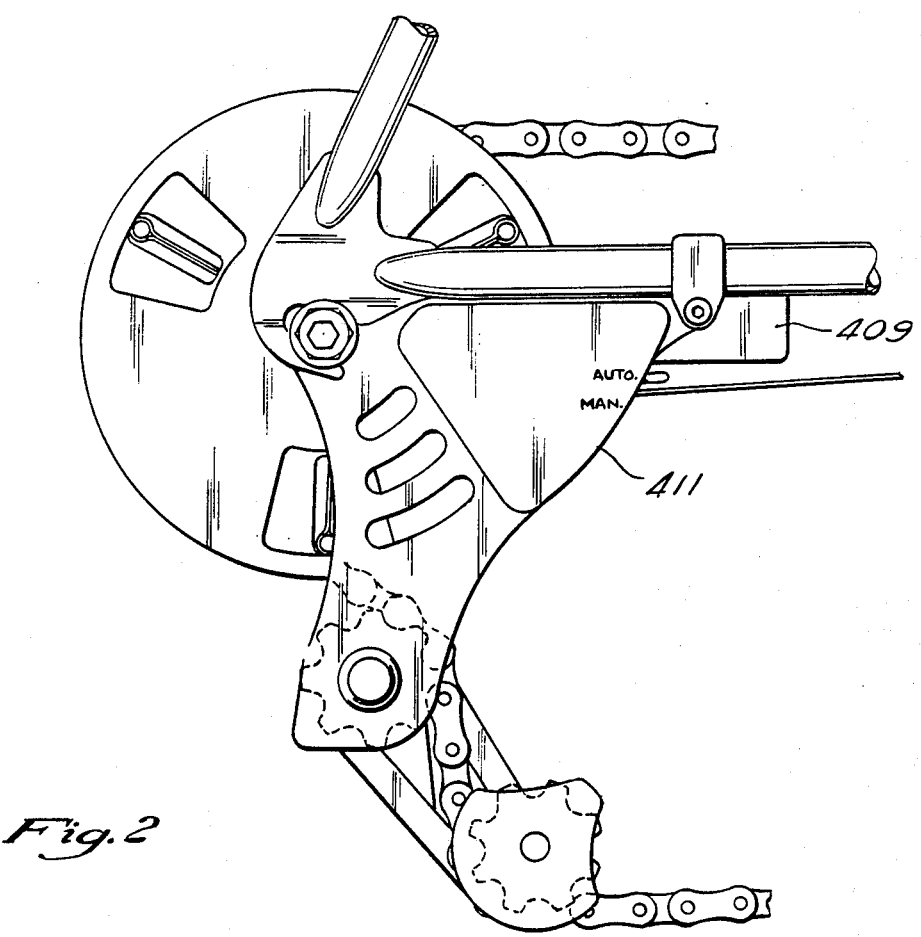
FIG. 2 is a side elevation of the sprocket assembly shown in FIG. 1, as viewed from the outboard side, with all dust covers in place.
Figure 28:
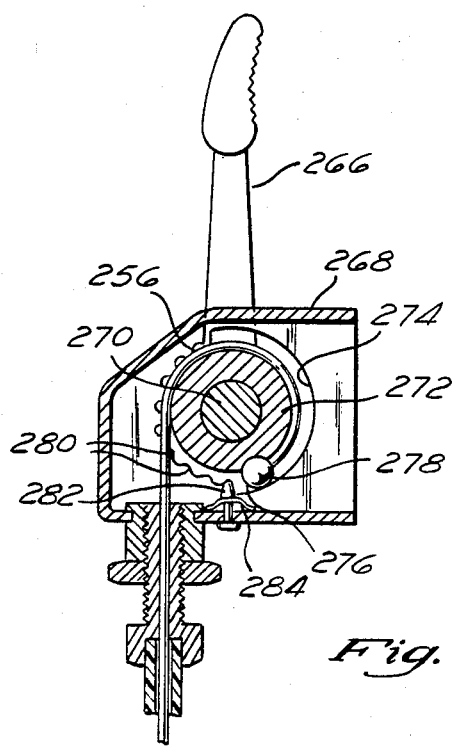
FIG. 28 is a cross-sectional side elevation of a manual shifter lever.

When in the manual transmission mode, gear shifting is initiated by displacement of the cable 256 by means of a shifter lever 266, shown in FIGS. 2 and 28. The shift lever 266 extends through a housing 268 which is fixed o the bicycle frame 156. Within the housing 268, a stationary support shaft 270 is provided. The support shaft 270 is surrounded by an annular shift pulley 272 which is secured to the shift level 266. The pulley 272 is rotatable about the shaft 270.

A portion of the periphery of the shift pulley 272 has an arcuate channel 274 therein. The channel 274 communicates with a circular recess 276, in which a cylindrical plug 278 is retained. The plug 278 is secured to one end of the cable 256. The cable 256 rests within the channel 274 and wraps around the periphery of the pulley 272.

A portion of the periphery of the shift pulley 272 has a plurality of grooves 280 formed therein. A gear selector pin 282 extends through the housing 268 and is biased into engagement with the grooves 280 by means of a leaf spring 284.

In order to shift gears, the shift lever 266 is manually rotated, causing rotation of the shift pulley 272 and displacement of the cable 256. Due to the engagement between the gear selector pin 282 and the grooves 280, the shift pulley 272 rotates in discrete angular increments, each corresponding to the degree of cable displacement 256 necessary in order to ultimately effect movement of the shift actuator 152 to the extent necessary to shift a single gear.

Another aspect of the invention is the manner in which the rear wheel 14 and the sprocket assembly 16 are rotatably mounted on the bicycle frame 156. Referring to FIG. 7, the sprocket hub 88 has an inner portion 286 which forms an outer bearing race for ball bearings 288. An inner bearing race 290 is fixed to a stationary tubular sprocket axle 292, which extends through the inner portion 288. The sprocket hub 88 thus is rotatable about the sprocket axle 292 with a minimum of friction. The sprocket axle 292 is externally threaded at both ends. The outboard end of the sprocket axle 292 extends through the sprocket housing 154 and is attached to the bicycle frame 156 by means of axle nuts 294.

Similarly, the rear wheel 14 has a wheel hub 296 which is rotatable about a tubular wheel axle 298. One end of the wheel axle 298 abuts against the sprocket axle 292. The other end of the wheel axle 298 engages a tubular spacer 300 which extends between the wheel axle 298 and the bicycle frame 156. The wheel axle 298 and the sprocket axle 292 are coaxial about the central axis 90. Ball bearings 302 are provided between the wheel axle 298 and the wheel hub 296 to minimize friction.

An elongated axle bolt 304 extends completely through the sprocket axle 292 and the wheel axle 298 and is fastened to the bicycle frame by a nut 306, thus forming an inner axle member which supports both the wheel axle 298 and the sprocket axle 292.

Referring also to FIG. 8, rotational force is transmitted from the sprocket hub 88 to the wheel hub 296 by means of a clutch assembly 308. The clutch 308 is formed by a circular ratchet member 310 on the wheel hub 296 having a plurality of radially inwardly facing ratchet teeth 312. A pair of dogs 314 is mounted on an annular shoulder 316 which protrudes from the sprocket hub inner section 286 and rests within the ratchet member 310. The dogs 314 are biased radially outwardly by a circumferential wire spring 318 which surrounds the shoulder 316. As illustrated in FIG. 8, the dogs 314 engage the ratchet teeth 312 so that upon rotation of the sprocket hub 88 and dogs 314 in the drive direction 26, the ratchet member 310 and wheel hub 296 will be caused to rotate therewith. Due to the orientation of teeth 312, the sprocket hub 88 is capable of rotation relative to the wheel hub 296 in a direction opposite the drive direction 26, thus permitting backpedaling.

The ratchet member 310 and the dogs 314 are disengaged by relative movement in an axial direction parallel to the central axis 90. Due to this feature, and the separate wheel axle 298 and sprocket axle 292, the rear wheel 14 can be removed from the bicycle 10 for repair or replacement while maintaining the sprocket assembly 16 secured in place on the bicycle frame 156. To remove the Wheel 14, the nut 306 is unfastened and the axle bolt 304 is withdrawn from the wheel and sprocket axles 298, 292. The spacer 300 is then removed, permitting the wheel 14 to move parallel to the central axis 90 a distance sufficient to disengage the ratchet member 310 from the dogs 314 and shoulder 316 of the sprocket assembly hub 88. The wheel 14 is then free to be removed completely from the bicycle frame 156, while the sprocket assembly 14 remains intact, secured to the bicycle 10. This obviates the need to remove the chain 18 each time the rear wheel 16 is removed.

The above-described transmission 220 requires relatively little force to change gears as compared to a conventional derailleur transmission. Thus, it is particularly advantageous because the operation of the transmission 220 can be controlled by the electric motor 238 with relatively low power requirements.

As set forth above, the present invention advantageously includes the electric motor 238 that rotates the worm gear 234. The worm gear 234 is selectively engageable with the outer gear 232 so that rotation of the electric motor 238 moves the shift actuator 152 and thereby changes the gears. A control circuit 400 that automatically controls the rotation of the electric motor 238 is illustrated in FIGS. 10 and 29-35.

Figure 10:
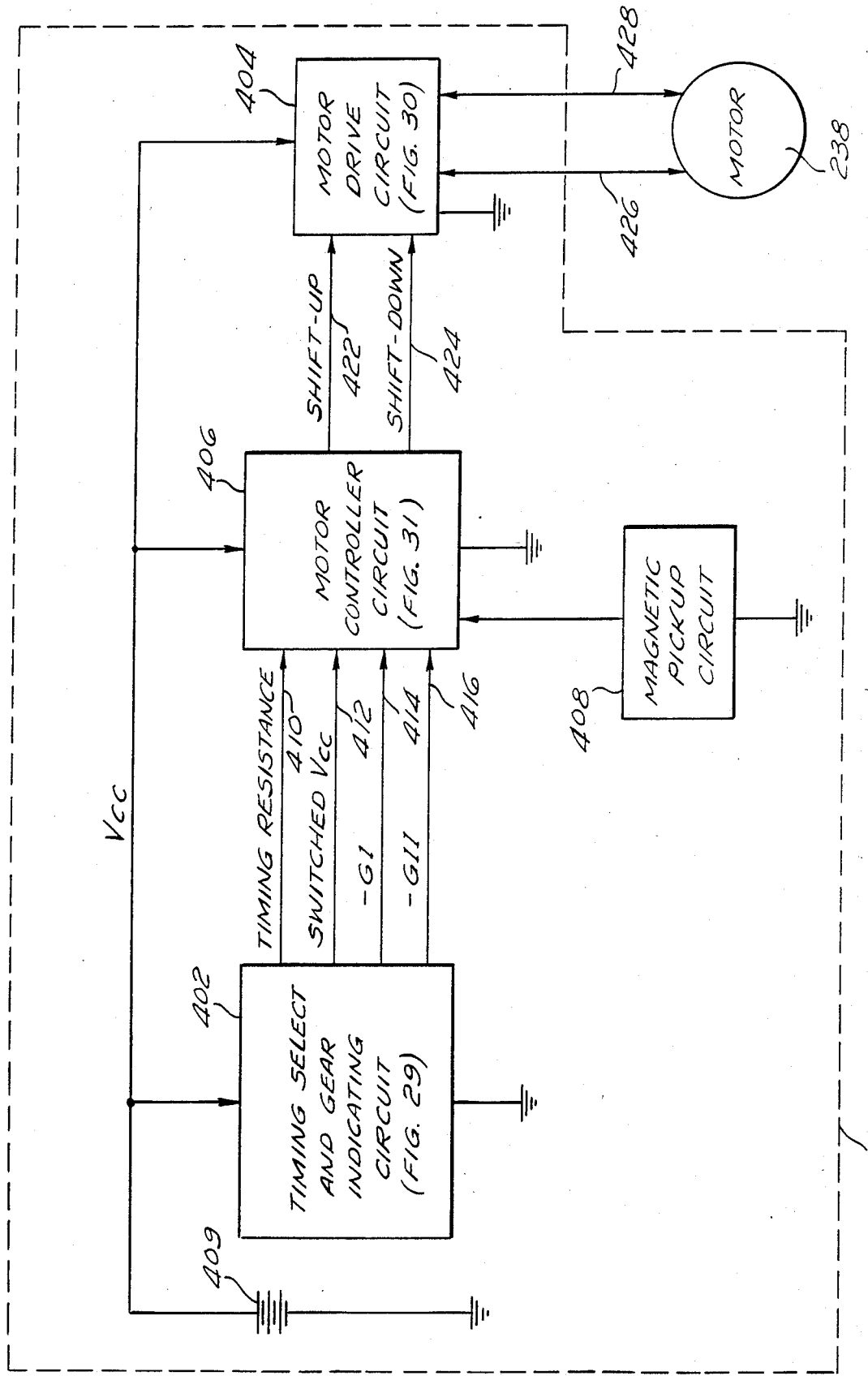
FIG. 10 is a block diagram of an automatic transmission control circuit in accordance with the present invention, showing the timing select and gear indicating circuit, the motor controller circuit, the motor drive circuit, the magnetic pickup circuit and the battery.
Figure 31:
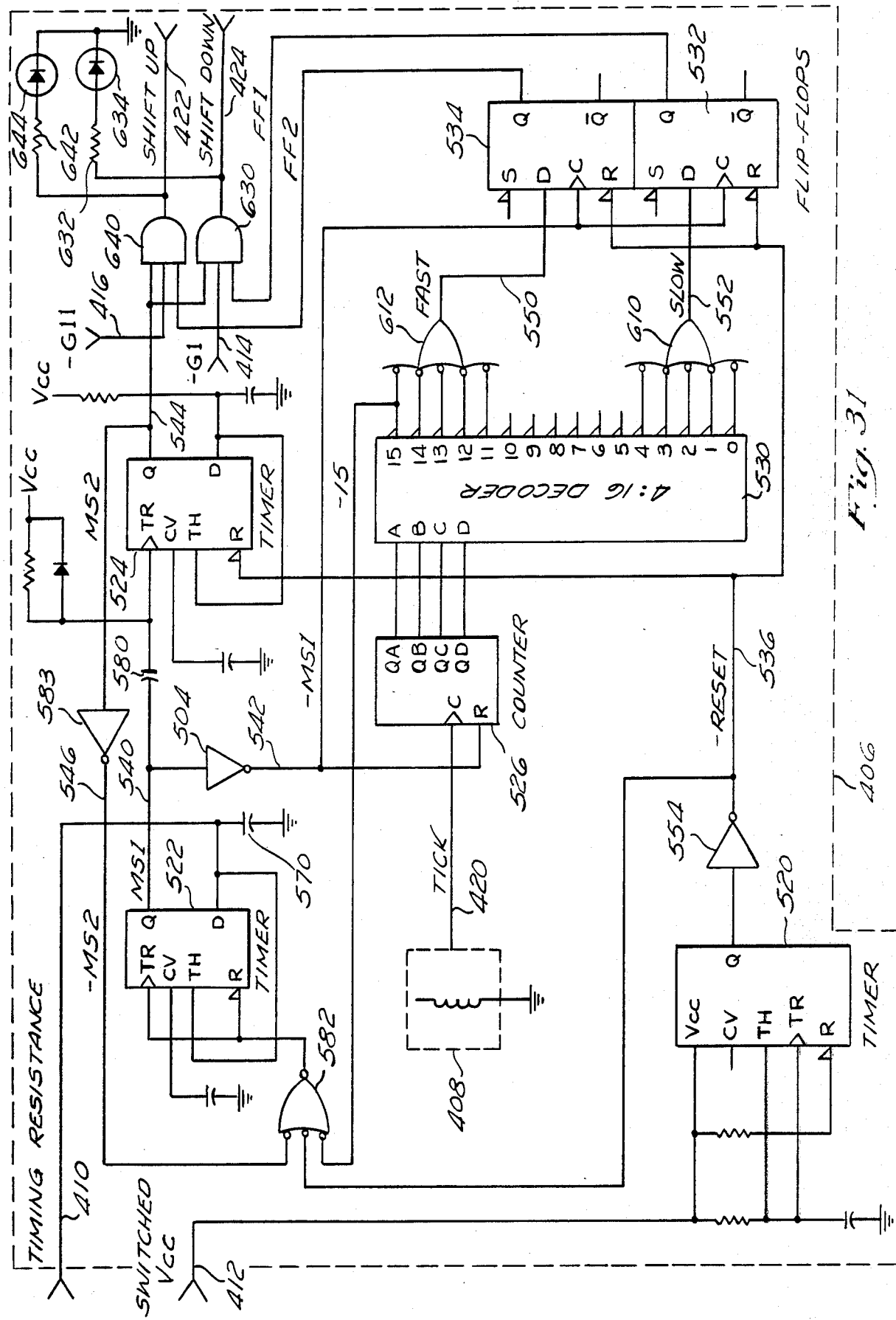
FIG. 31 is a detailed schematic diagram of the motor controller that receives pulses from the magnetic pickup circuit which indicates the wheel rotation rate and that receives the TIMING RESISTANCE from the timing select and gear-indicating circuit, and that generates the SHIFT-UP and signals to the motor drive circuit.

As illustrated in FIG. 10, the control circuit 400 comprises four circuits including: a timing select and gear indicating circuit 402, FIG. 29; a motor drive circuit 404, FIG. 30; and a motor controller circuit 406, FIG. 31; a magnetic pickup circuit 408, and a battery 409 (shown in phantom in FIG. 4). The electronics are enclosed in a dust shield 411 (FIG. 2).

The control circuit 400 automatically shifts gears depending on the wheel speed. The timing select and gear indicating circuit 402 provides input signals to the motor controller circuit 406 that include a TIMING RESISTANCE on a line 410, a SWITCHED Vcc signal on a line 412, a -G1 signal on a line 414 and a -G11 signal on a line 416. The TIMING RESISTANCE on the line 410 provides a variable resistance to the motor controller circuit 406 that is responsive to the currently selected gear of the transmission 220. The SWITCHED Vcc signal on a line 412 provides a supply voltage to the motor controller circuit 406 that is active when the transmission 220 is in gear and is inactive when the transmission is shifting between gears. The -GI signal on a line 414 is an active low signal that indicates to the motor controller circuit 406 that the transmission 220 is in the lowest gear (i.e., gear one). and therefore, the motor controller 406 should not attempt to shift the transmission 220 any lower. Similarly, the -G11 signal on the line 416 is an active low signal that indicates to the motor controller circuit 406 that the transmission 220 is in the highest gear (i.e., gear eleven). and that the motor controller 406 should not attempt to shift up. On a line 420, the motor controller 406 also receives an input signal from the magnetic pickup circuit 408 which is a conventional transducer circuit that provides a sequence of pulses that are spaced apart in time in accordance with the rotational velocity of the bicycle wheel. The pulses indicate the speed of the bicycle to the motor controller circuit 406.

The motor controller 406 outputs a SHIFT-UP signal on a line 422 and a SHIFT-DOWN signal on a line 424 to the motor drive circuit 404. An active SHIFT-UP signal on the line 422 causes the motor drive circuit 404 to apply power to the motor 238 in a first direction which causes the transmission to shift up. An active SHIFT-DOWN signal on the line 424 causes the motor drive circuit 404 to apply power to the motor 238 in a second direction to cause the transmission to shift down. In order to accomplish a shift-up or a shift-down, the motor drive circuit 404 is connected to the motor 238 via a first bidirectional motor power line 426 and a second bidirectional motor power line 428. To shift the gears up, one polarity is placed on the motor power lines 426, 428 of the motor 238 to cause current flow through the motor in a first direction; and, for a shift-down, the opposite polarity is placed on the motor power lines 426, 428 to cause current flow in the opposite direction.

The timing select and gear indicating circuit 402, shown in FIG. 29, comprises a set 429 of eleven switches 430-440, eleven resistors 445-455, eleven diodes 460-470 and eleven light-emitting diodes (LED's) 475-485, corresponding to each of the eleven gears of the transmission 220. Additional switches can be provided if the number of gears is increased. The set of switches 429 is also illustrated physically in FIG. 4 as an insulating block on which eleven switch contacts 430-440 are mounted. The switch contacts 430-440 are numbered in accordance with the corresponding switches 430-440 in FIG. 29. One switch, one resistor, one diode and one light-emitting diode are provided for each of the eleven gears. For example, the resistor 445, the switch 430, the diode 460, and the LED 475 are associated with the lowest gear, gear one. Similarly, the resistor 455, the switch 440, the diode 470, and the LED 485 are associated with the highest gear, gear eleven.

As illustrated in FIG. 29, each of the switches 430-440 in the set 429 is connected to power (Vcc) on a positive voltage bus 490. The voltage on the line 490 is advantageously provided by the battery 409. The bus 490 is illustrated in FIG. 4 as a length of copper conductor on the shifter rack 164. The electrical power from the battery 409 is provided to the bus 490 via a wiper contact 491 that is fixedly mounted to the set of switches 429. The electrical power on the bus 490 is conducted to a selected one of the switch contacts 430-440 by a moving contact 493 that moves along with the shifter rack 164 and thus moves from switch contact to switch contact as the transmission 220 shifts gears. Of the eleven switches 430-440, only one can be closed at any one time in accordance with the current position of the moving contact 493. Thus, although illustrated as eleven separate switches in FIG. 29, it should be understood that the set of switches 429 physically comprises one eleven-position switch in the described embodiment. The switch corresponding to a particular gear will be closed to indicate when the transmission is in that gear. The switch contacts 430-440 (FIG. 4) are spaced apart so that the moving contact 493 disengages from one switch contact before engaging the next switch contact. Thus, all of the switches 430-440 will be open when the transmission 220 is shifting between gears.

For gear one, the contact 430 (i.e., the switch 430) is connected to the power bus 490 by moving contact 493. The contact 430 is electrically connected to a line 492 that is also connected one lead of the resistor 445, the anode of the diode 460 and the anode of the light-emitting diode 475. The other lead of the resistor 445 is connected together with the other resistors 446-455 and represents the TIMING RESISTANCE on the line 410. The cathode of the diode 460 is connected together with the cathodes of the other diodes 461-470 and represents the SWITCHED Vcc signal on the line 412. The cathode of the light-emitting diode 475 is attached to ground. Gears two through eleven are similarly wired with each gear having its respective switch contact 431-440, resistor 446-455, diode 461-470 and light-emitting diode 476-485 interconnected as described above.

Depending on the particular switch 430-440 that is closed, a corresponding light-emitting diode 476-485 will be turned on indicating to the user of the bicycle which gear the transmission 220 is in. Although the disclosed embodiment has eleven light-emitting diodes 475-485 to indicate which gear is being used, it should be understood that the switch contacts 430-440 can also be connected to an encoder to drive a pair of seven-segment light-emitting diodes or other similar display devices to provide a digital display of the currently enabled gear.

As set forth above, one lead of each of the resistors 445-455 is connected together to provide the TIMING RESISTANCE on the line 410. At most, only one switch will be closed to provide a single value of resistance between the power bus 490 and the TIMING RESISTANCE line 410. Each of the resistors 445-455 vary in resistance according to the gear being used. As will be described in more detail below, for the lower gears a higher value of resistance will be used to increase the amount of time before the wheel speed is checked, and vice versa for the higher gears.

The SWITCHED Vcc signal on the line 412 will have power applied to it when one of the contacts 430–440 is engaged by the moving contact 493. Otherwise, when the transmission 220 is between gears, none of the contacts 430–440 are engaged and no power is provided on the SWITCHED Vcc line 412.

The gear one switch contact 430 is also connected via the line 492 to the input of an inverter 494. The output of the inverter 494 is connected to the -GI signal line 414. The G1 signal on the line 414 will be active when the transmission 220 is in the lowest gear, and, as will be described below, will prevent the motor controller circuit 406 from attempting to shift to any lower gear. Similarly, the gear eleven switch contact 440 is connected via a line 496 to the input of an inverter 498. The output of the inverter 498 is provided as the -G11 signal on the line 416. Thus, when the switch 440 is closed (i.e., the contact 440 is engaged by the moving contact 493), the -G11 signal will be activated on the line 416 to inhibit the motor controller circuit 406 from attempting to shift to a higher gear.

FIG. 30 illustrates the details of the motor drive circuit 404. Upon assertion of either the SHIFT-UP signal on the line 422 or the SHIFT-DOWN signal on the line 424 from the motor controller circuit 406, the motor drive circuit 404 will turn the motor 238 either clockwise or counterclockwise in accordance with the direction of the current applied to the bidirectional motor power lines 426, 428.

The motor drive circuit 404 of FIG. 30 comprises a first transistor 500, a second transistor 502, a third transistor 504, a fourth transistor 506, a first resistor 510, a second resistor 512, a third resistor 514 and a fourth resistor 516. The first transistor 500, has its base connected to the SHIFT-UP signal on the line 422, its emitter connected to the first motor power line 426 and its collector connected to power (Vcc). The second transistor 502, has its base connected to the SHIFT-DOWN signal on the line 424, its emitter connected to the second motor power line 428, and its collector connected to power (Vcc). The third transistor 504 has its base connected in common to a first lead of the first resistor 510 and a first lead of the second resistor 512, its emitter connected to ground, and its collector connected to the second motor power line 428. The fourth transistor 506 has its base connected to a first lead of the third resistor 514 and a first lead of the fourth resistor 516, its emitter connected to ground, and its collector connected to the first motor power line 426 of the motor 238. The second lead of first resistor 510 is connected to the SHIFT-UP signal on the line 422. The second lead of the second resistor 512 is connected to ground. The second lead of the third resistor 514 is also connected to ground. The second lead of the fourth resistor 516 is connected to the SHIFT-DOWN signal on the line 424.

There are three combinations of signals which are applied to the motor drive circuit 404. First, both the SHIFT-UP signal on the line 422 and SHIFT-DOWN signal on the line 424 can be low. When this occurs, none of the four transistors 500, 502, 504, 506 are active. Thus, no current flows to the electric motor 238.

Second, when the SHIFT-UP signal on the line 422 is high and the SHIFT-DOWN signal on the line 424 is low, the first transistor 500 and the third transistor 504 are both turned on, and the second transistor 502 and the fourth transistor 506 are both off. This combination connects ground to the second motor power line 428 through the collector and emitter of the third transistor 504, and connects power from Vcc to the first motor power line 426 through the first transistor 500. The SHIFT-DOWN signal on the line 424 applies a low voltage to the base of both the second transistor 502 and the fourth transistor 506. A high voltage applied to the first motor power line 426 and a low voltage applied to the second motor power line 428 provides current in a first direction to the motor 238 so that it turns in a first direction (e.g., counterclockwise). This causes the shifter rack 164 (FIG. 4) to move inward to decrease the effective sprocket diameter.

Third, when the SHIFT-UP signal on the line 422 is low and the SHIFT-DOWN signal on the line 424 is high, the second transistor 502 and the fourth transistor 506 are both turned on, and the first transistor 500 and the third transistor 504 are turned off. The second transistor 502 connects the high voltage (Vcc) to the second motor power line 428. The fourth transistor 506 connects ground to the first motor power line 426. This causes the motor 238 to turn in the opposite direction than when the SHIFT-UP signal is high and the SHIFT-DOWN signal is low (i.e., clockwise).

Additional details of the motor controller circuit 406 are illustrated in FIG. 31. The motor controller circuit 406, receives an input signal comprising a series of spaced-apart pulses from the magnetic pickup 408 and the TIMING RESISTANCE input and SWITCHED Vcc input from the timing select and gear indicating circuit 402 of FIG. 29, and automatically outputs the SHIFT-UP and SHIFT-DOWN signals on the lines 422, 424 to the motor drive circuit 404 of FIG. 30. The motor controller circuit 406 comprises a timer 520, a first monostable multivibrator ("one shot") 522, a second monostable multivibrator 524, a counter 526, a decoder 530, a first flip-flop 532, a second flip-flop 534 and other interconnecting circuitry. The motor controller circuit 406 also has a number of signals which it uses internally such as a -RESET signal on a line 536 which resets the motor controller circuit 406 after a gear change; a MS1 signal on a line 540 which is the output of the first monostable multivibrator 522; a -MS1 signal on a line 542 which is the inverse of the MS1 signal on the line 540; a MS2 signal on a line 544 which is the output of the second monostable multivibrator 524; a -MS2 signal on a line 546 which is the inverse of the MS2 signal 544; a FAST signal on a line 550 which indicates that the bicycle wheel is turning too fast for a particular gear; and a SLOW signal on a line 552 which indicates that the bicycle wheel is turning too slow for a particular gear.

The -RESET signal is generated by a reset circuit that comprises the timer 520, an inverter 554, and associated tuning and biasing components connected to the timer. The timer 520 is advantageously a XR-L555 micropower timing circuit, or an equivalent. Unlike the other components of the motor controller circuit 406, which are connected to the Vcc supply provided by the battery 409, the timer 520 has its Vcc power input connected to the SWITCHED Vcc signal on the line 412 from the timing select and gear indicating circuit 402. Thus, the timer 520 only has power applied to it when the SWITCHED Vcc line 412 is active high. The Q output of the timer 520 is inverted by the inverter 554 and is provided as the -RESET signal on the line 536.

The -RESET signal on the line 536 resets the first flip-flop 532 which stores the state of the SLOW signal on the line 552, and also resets the second flip-flop 534 which stores the state of the FAST signal on the line 550. Further, the -RESET signal on the line 536 resets the first monostable multivibrator 522, and the second monostable multivibrator 524.

When the transmission 220 is stable in one of the gears, the SWITCHED Vcc signal on the line 412 will be at a high voltage level, therefore, the timer 520 will be switched on and its Q output will be low. Thus, the -RESET signal line 536 will be at a high voltage level. As long as the gear shifter remains in one gear, nothing will affect the power to the timer 520 and the -RESET signal line 536 will remain high. However, when the gears are changed, there will be a short amount of time when all the switches are open, as the moving contact 493 moves with the shifter rack 164 between two adjacent switch contacts 430–440. Thus, no power will be connected to the Vcc input of the timer 520 because the SWITCHED Vcc line 412 is at a low voltage level. Since the timer 520 will produce no Q output, the inverter 554 will continue to assert a high voltage level on its output and the -RESET signal on the line 536 will remain inactive. When the next gear is reached, one of the switches 430–440 will close to apply Vcc to the SWITCHED Vcc line 412. The rising edge of the SWITCHED Vcc signal on the line 412 will turn the power back on to the timer 520. When the power is first turned back on, the timer 520 will generate an output pulse of fixed duration that is inverted by the inverter 554 to provide the -RESET signal on the line 536. The -RESET signal is shown as a pulse 564, 566, 568 in the timing diagrams of FIGS. 33, 34 and 35, respectively.

Figure 32:
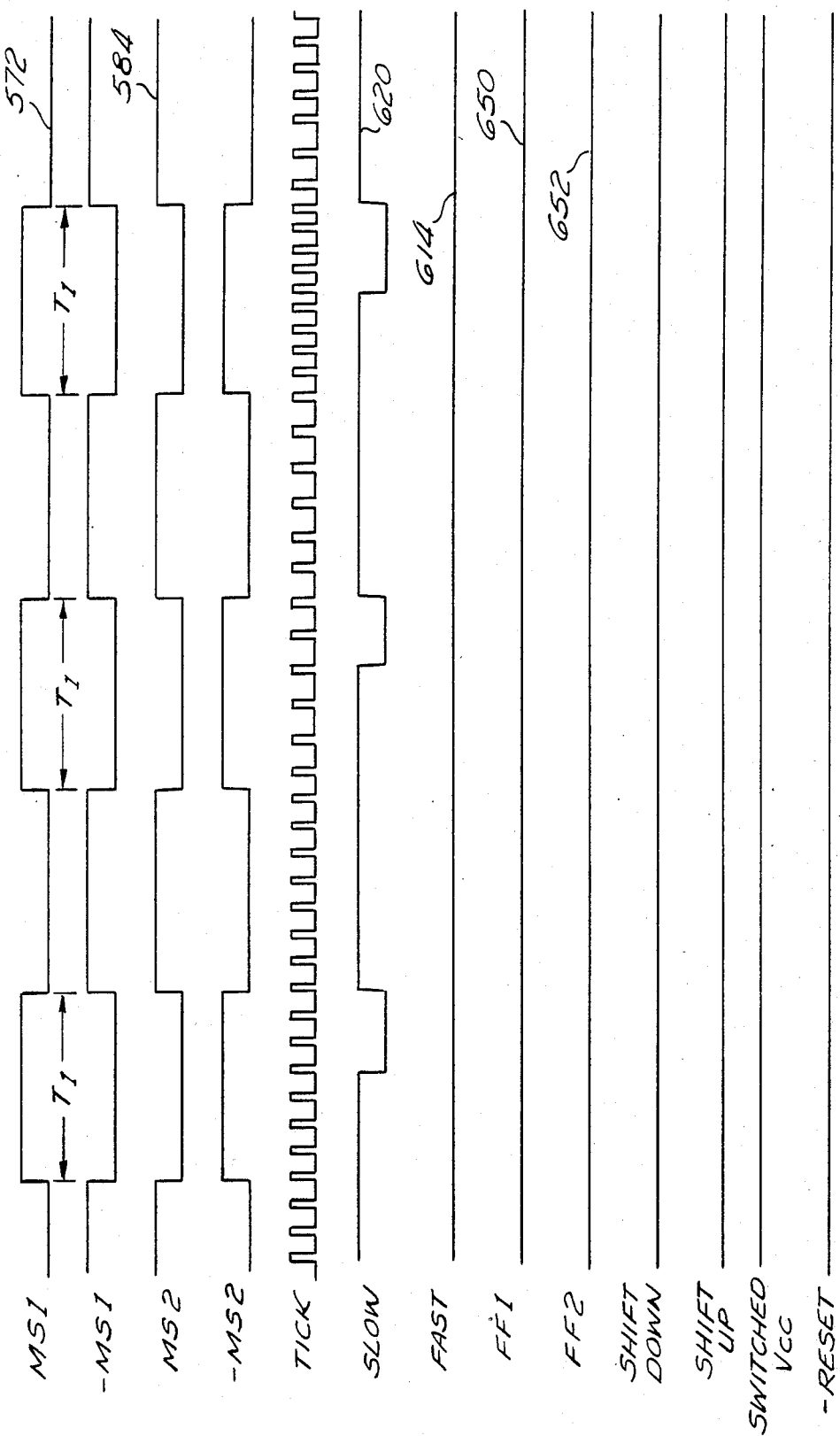
FIG. 32 is a set of timing diagrams representing the signals within the motor controller circuit which will occur when the wheel rotation rate is within an acceptable range for the current gear so that no shifting occurs.
Figure 33:
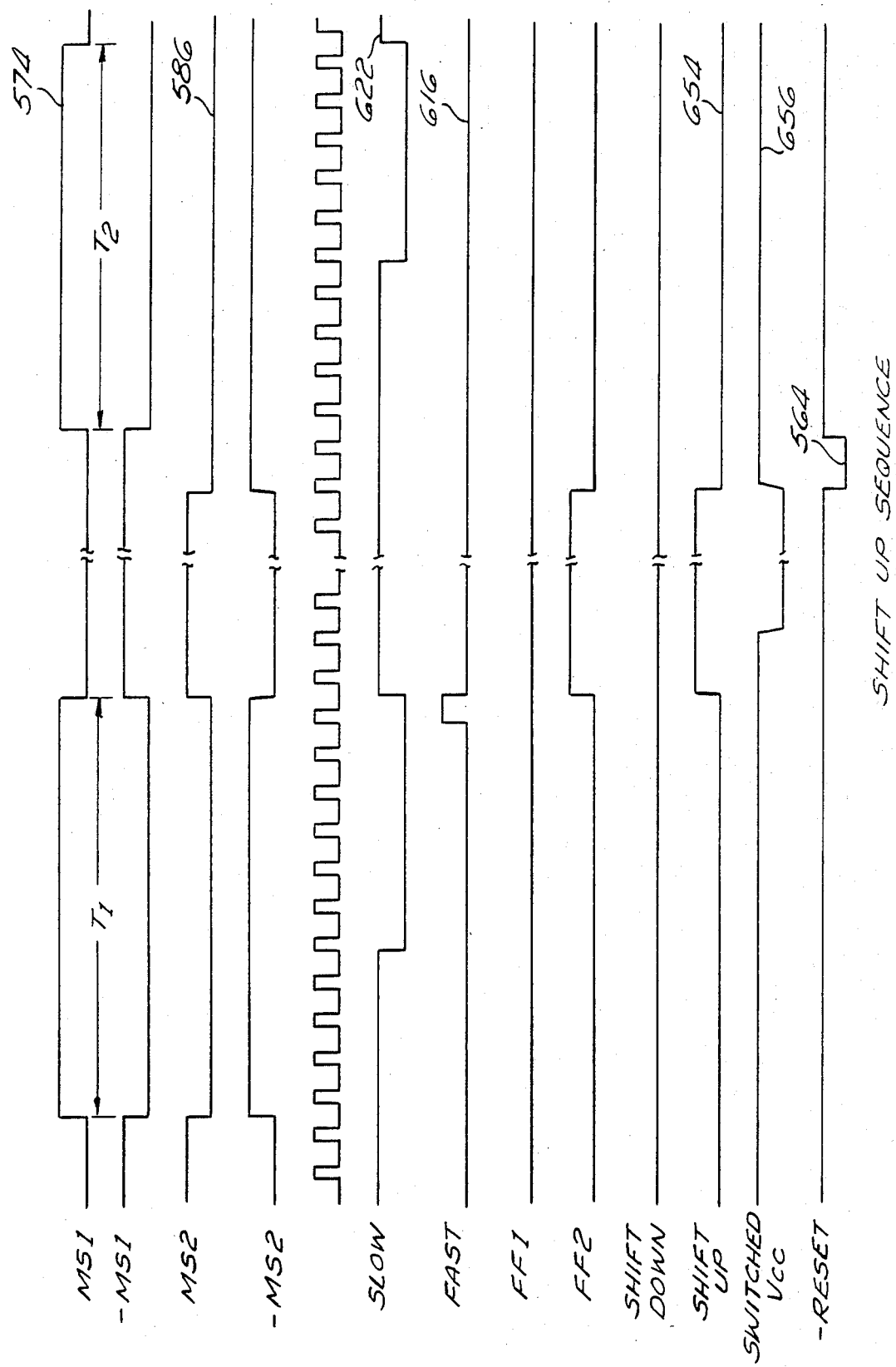
FIG. 33 is a set of timing diagrams representing the signals within the motor controller circuit which will occur when the wheel rotation rate is within a range of wheel rotation rates for the currently selected gear that are too high for the current gear so that the motor is operated to shift the transmission to a higher gear.
Figure 34:
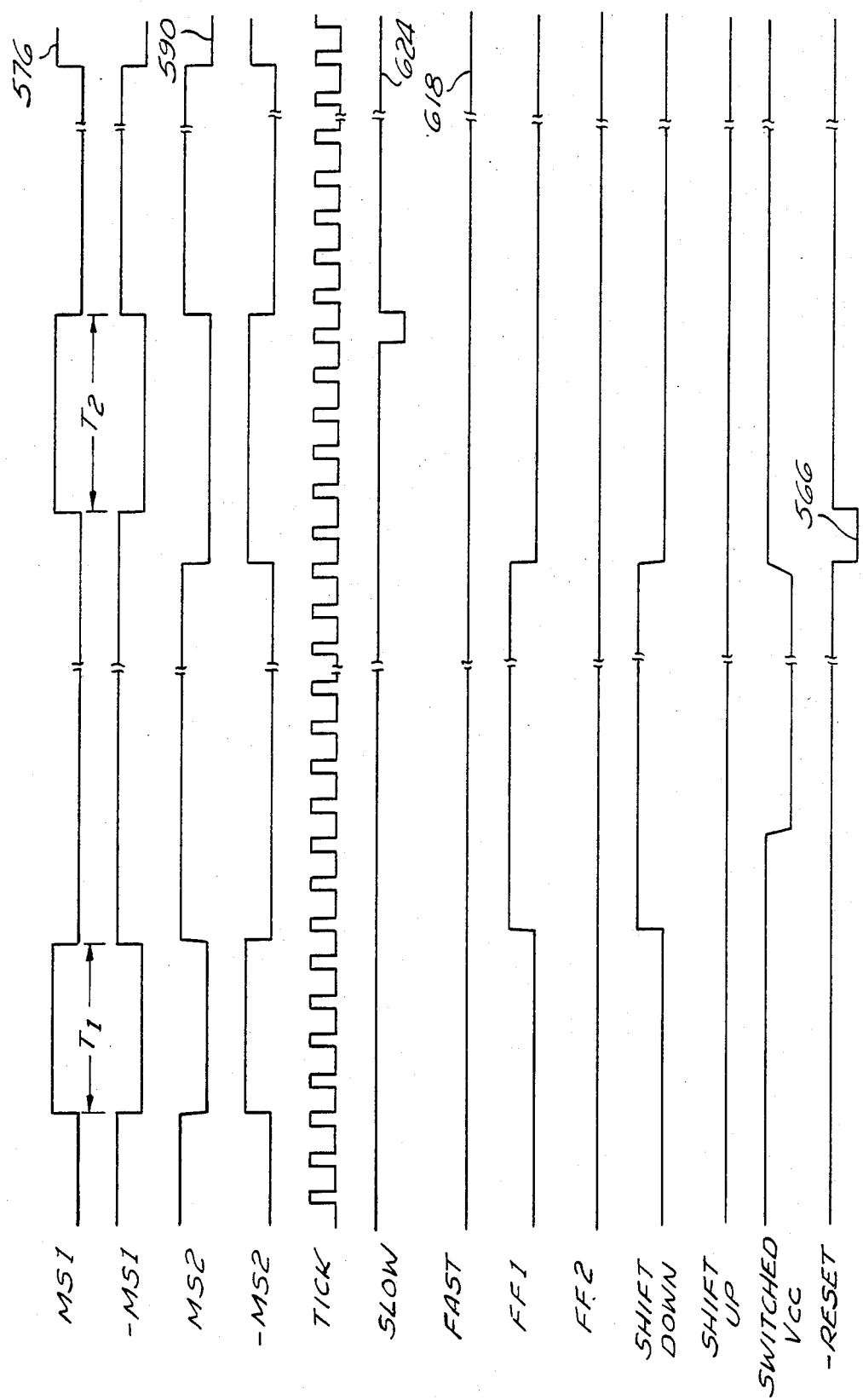
FIG. 34 is a set of timing diagrams representing the signals within the motor controller circuit which will occur when the wheel rotation rate is within a range of wheel rotation rates that are too low for the current gear so that the motor is operated to shift the transmission to a lower gear.

In the exemplary embodiment of the motor controller circuit 406, the two monostable multivibrator timing circuits 522, 524 are XR-L556 timers that are each connected to timing components to operate as one-shot timers. The first monostable multivibrator 522 generates a timing pulse that is dependent on the gear ratio. As set forth above, the timing select and gear indicating circuit 402 of FIG. 29 connects one of the eleven resistors 445–455 between the Vcc bus 490 and the TIMING RESISTANCE line 410. The TIMING RESISTANCE line 410 is connected to a timing capacitor 570 of the first monostable multivibrator 522. By selecting one of the resistors 445–455, the RC time constant of the capacitor 570 and the selected resistor will be varied to vary the width of the output pulse generated by the multivibrator 522. Exemplary signal waveforms 572, 574 and 576, generated by the Q output of the first monostable multivibrator 522, are seen in FIGS. 32, 33 and 34, respectively.

The output of the first monostable multivibrator 522 is used to control other functions in the circuit. The Q output of the first monostable 522, the MS1 signal on the line 540, is connected to a capacitor 580 which in turn is connected to the trigger input of the second monostable 524. The capacitor 580 operates to cause the second monostable 524 to be triggered at the end of the MS1 pulse on the line 540. The leading edge of the -MS1 signal on the line 542 clocks the first flip-flop 532 and the second flip-flop 534. Since the -MS1 signal is the inverse of the MS1 signal on the Q output of the first monostable, the flip-flops 532, 534 are triggered at the end of the pulse on MS1.

The -MS1 signal on the line 542 also controls the counter 526. When the -MS1 signal is low, the counter 526 is enabled so that it counts. When the -MS1 signal switches to its high level at the end of the pulse, the counter 526 is reset.

The first monostable 522 can be reset by three signals, the -RESET signal on the line 536, the -MS2 signal on the line 546, and the output 15 of the decoder 530. The three signals are logical OR'ed together by an OR-gate 582, and the output of the OR-gate 582 is connected to both the reset and the trigger of the first monostable 522. The first monostable 522 is reset whenever any of these signals is active.

The second monostable 524 produces the MS2 signal on the line 544 when it is triggered by the end of the MS1 signal on the line 540 via a coupling capacitor 580. The MS2 signal is inverted by an inverter 583 and is provided as a -MS2 signal on a line 546. The second monostable multivibrator 524 maintains the MS2 signal active on the line 44 and the -MS2 signal on the line 546 for slightly longer than the time needed for the motor 238 to shift gears. Exemplary waveforms 584, 586, 590 for the MS2 signal are shown in FIGS. 32, 33 and 34, respectively. The -MS2 signal resets the first monostable 522 so that it generates the pulse MS1 at the end of the pulse MS2. This reset is used to restart the first monostable when there is no gear change, as illustrated by the timing diagrams in FIG. 32. The two monostables 522, 524 operate together to create the waveforms as seen in the timing diagrams of FIGS. 32, 33, 34 and 35.

The remainder of the motor controller circuit 406 will determine the speed of the wheel, determine whether shifting is needed, and output the SHIFT-UP signal or the SHIFT-DOWN signal. The magnetic pickup 408 is used to determine the speed of wheel. The output of the magnetic pickup 408 is input to the clock of the counter 526 on the line 420. An exemplary counter 526 is a 4-bit, binary counter such as an SN7493A, from Texas Instruments, or a CMOS equivalent counter. The four outputs of the counter 526 are fed to the 4-line to 16-line decoder 530, which may be, for example, an SN74154 1-of-16 decoder/demultiplexer from Texas Instruments, or an equivalent. The counter 526 is reset by the -MS1 signal and is enabled to count during the MS1 signal. The first five outputs (0–4) of the decoder 530 (corresponding to the first five counts of the counter 526) are input to an NOR-gate 610 to produce the SLOW signal on the line 552 when any one of the five outputs is active. The SLOW signal on the line 552 is provided as the D-input of the first flip-flop 532, and indicates that the counter 526 did not receive a sufficient number of pulses from the magnetic pickup 408 during the time that the counter 526 was enabled by the -MS1 signal. The last five outputs (11–15) of the decoder 530 (corresponding to counts of 11 through 15 from the counter 526) are input to an NOR-gate 612 to produce the FAST signal on the line 550 when any one of the five outputs is active. The FAST signal on the line 550 is provided as an input to the D-input of the second flip-flop 534, and indicate that the counter 526 received too many pulses during the time that it was enabled. The last output (15) of the decoder 530 is also connected to the OR-gate 582 together with the -RESET signal on the line 536 and the -MS2 signal on the line 546 to reset the first monostable 522. Exemplary waveforms 614, 616, 618 of the FAST signal on the line 550 can be seen in FIGS. 32, 33 and 34, respectively. Exemplary waveforms 620, 622, 624 of the SLOW signal on the line 552 can be seen in FIGS. 32, 33 and 34, respectively.

The flip-flops 532, 534 serve as memory devices to hold the SLOW signal 552 and the FAST signal 550. The flip-flops 532, 534 are clocked by the leading edge of the -MS1 signal on the line 542, corresponding to the trailing edge of the MS1 signal. The Q output (designated as "FF1") of the first flip-flop 532 indicates that the bicycle wheel is turning too slow for the present gear and that the gear needs to be shifted down. The Q output is provided as an input to an AND-gate 630, along with the -G1 signal on the line 414 and the MS2 signal on the line 544. The output of the AND-gate 630 produces the SHIFT-DOWN signal on the line 424. The output of the AND-gate 630 is also connected to a resistor 632 in series with a light-emitting diode (LED) 634 which is connected to ground so that the LED 634 emits light to indicate that the automatic transmission is shifting down.

Similarly, the Q output of the second flip-flop 534 (designated as "FF2") is sen& to an AND-gate 640 along with the -G11 signal on the line 416 and MS2 signal on the line 544. The output of the AND-gate 640 produces the SHIFT-UP signal on the line 422. The output of the AND-gate 640 is also connected to a resistor 642 in series with a light emitting diode 644 which in turn is connected to ground. The light emitting diode 644 emits light to indicate when the transmission is shifting up.

The AND-gates 630, 640 act as enabling gates so that the SHIFT-UP and the SHIFT-DOWN signals can be asserted only when properly timed in synchronism with the MS2 signal on the line 544. Thus, the gears can be shifted only at specified times. The length of time that the MS2 signal is active is selected to be sufficiently long enough that the motor 238 operates to move the shifter rack 164 (FIG. 4) between two adjacent gear positions. As will be discussed below, the MS2 signal can be selected to be a much larger timing component than necessary to shift between two adjacent gears because the -RESET signal will prevent the MS2 signal from operating longer than the time needed to shift one gear position.

There are four possible scenarios for operation of the motor controller circuit 406. First, there may be no gear change. If this is the case, the first monostable 522 is just an oscillator which is reset by the second monostable 524. The MS1 signal on line 540 is active for a time T1 dependent on the resistance selected through the TIMING RESISTANCE. The waveform 572 for the MS1 signal on line 540 can be seen in timing diagram of FIG. 32. There is no other activity on any of the other signals other than the SLOW signal on the line 552. The SLOW signal on the line 552 is asserted when the decoder 530 is in states zero through four, as seen from the waveform 620 in FIG. 32. The SLOW signal on line 552, however, is not clocked into the first flip-flop 532 to enable the SHIFT-DOWN signal on line 424 because the flip-flops 532, 534 are only clocked on the rising edge of the -MS1 signal on line 542. As can be seen from the waveforms 650, 652 in the timing diagrams of FIG. 32, the -MS1 signal on the line 542 never has a rising edge when the SLOW signal 552 is asserted. On the other hand, since the wheel speed is within the correct range for the selected gear, the MS1 signal on line 540 will time-out before the FAST signal on the line 550 will be asserted. Thus, the counter 526 will have a binary count of five through ten, and neither the first flip-flop 532 nor the second flip-flop 534 will be enabled.

A second sequence of operation is the shift-up sequence of FIG. 33. In the shift-up sequence, the wheel will be turning too fast, thus, the sprocket needs to be shifted to a higher gear. In such a case, the length (T1) of the pulse MS1, as determined by the current value of the resistance connected to the TIMING RESISTANCE line 410 is too large. Thus, the counter 526 will count to a count in the range of 11 through 15 before the MS1 signal times out. Thus, when the MS1 signal on the line 540 has a falling edge (i.e., -MS1 has a rising edge), the FAST signal on the line 550 is high (see waveform 616 of FIG. 33). The FAST signal will be latched into the second flip-flop 534. Since the MS2 signal on the line 544 will become active at the same time the MS1 signal on the line 540 becomes active, the FF2 signal out of the second flip-flop 534 to be enabled through the AND-gate 640 and activate the SHIFT-UP signal on the line 422. Once the gear shift has begun, this will put a low voltage on the SWITCHED Vcc signal on the line 412 while the transmission 220 is between gears. When the transmission 220 has completed the shift to the next higher gear, the SWITCHED Vcc signal on the line 412 will return to its high level, as seen in waveform 656 of FIG. 33. This causes the activation of the -RESET signal as seen in the waveform 564 of FIG. 33. Once the -RESET signal on line 536 becomes inactive, the MS1 signal on line 540 will become active as before. However, the resistance on the TIMING RESISTANCE line 410 will be smaller to decrease the length of the pulse MS1 so that the counter 526 is enabled for a shorter amount of time, and thus counts a smaller number of pulses from the magnetic pickup circuit 408.

A third scenario is a shift-down sequence of FIG. 34. In a shift-down sequence, the MS1 signal is too short (i.e., the time T1 is too short). Thus, the counter 526 will only count in the range of 0 to 4 times. Thus, the output of the decoder 530 will be in one of states zero through four and the SLOW signal on the line 552 will be active to indicate that the current gear is too high for the present speed of the bicycle wheel. On the falling edge of the MS1 pulse, the SLOW signal on line 552 will be clocked into the first flip-flop 532. At the same time, the MS2 signal 544 will become active. Thus, the AND-gate 630 will enable the FFI output of the first flip-flop 532 to generate the SHIFT-DOWN signal on the line 424 to power the motor 238. Once the motor 238 begins to shift the gears, the SWITCHED Vcc signal on the line 412 will be disabled since the transmission 220 will be shifting between gears. Thus, no power will be applied to the timer 520 and it will be turned off. Once the gear shift is complete, the power to the timer will be turned on and this will create a pulse on the -RESET signal on the line 536 as shown by the waveform 566 of FIG. 34. At the end of the -RESET signal on the line 536, the first monostable 522 will generate an MS1 pulse having a longer pulse duration because a new resistance will have been enabled onto the TIMING RESISTANCE line 410. Thus, the counter 526 will be enabled for a longer time so that it is more likely that it will receive a count in the range of five through ten.

Figure 35:
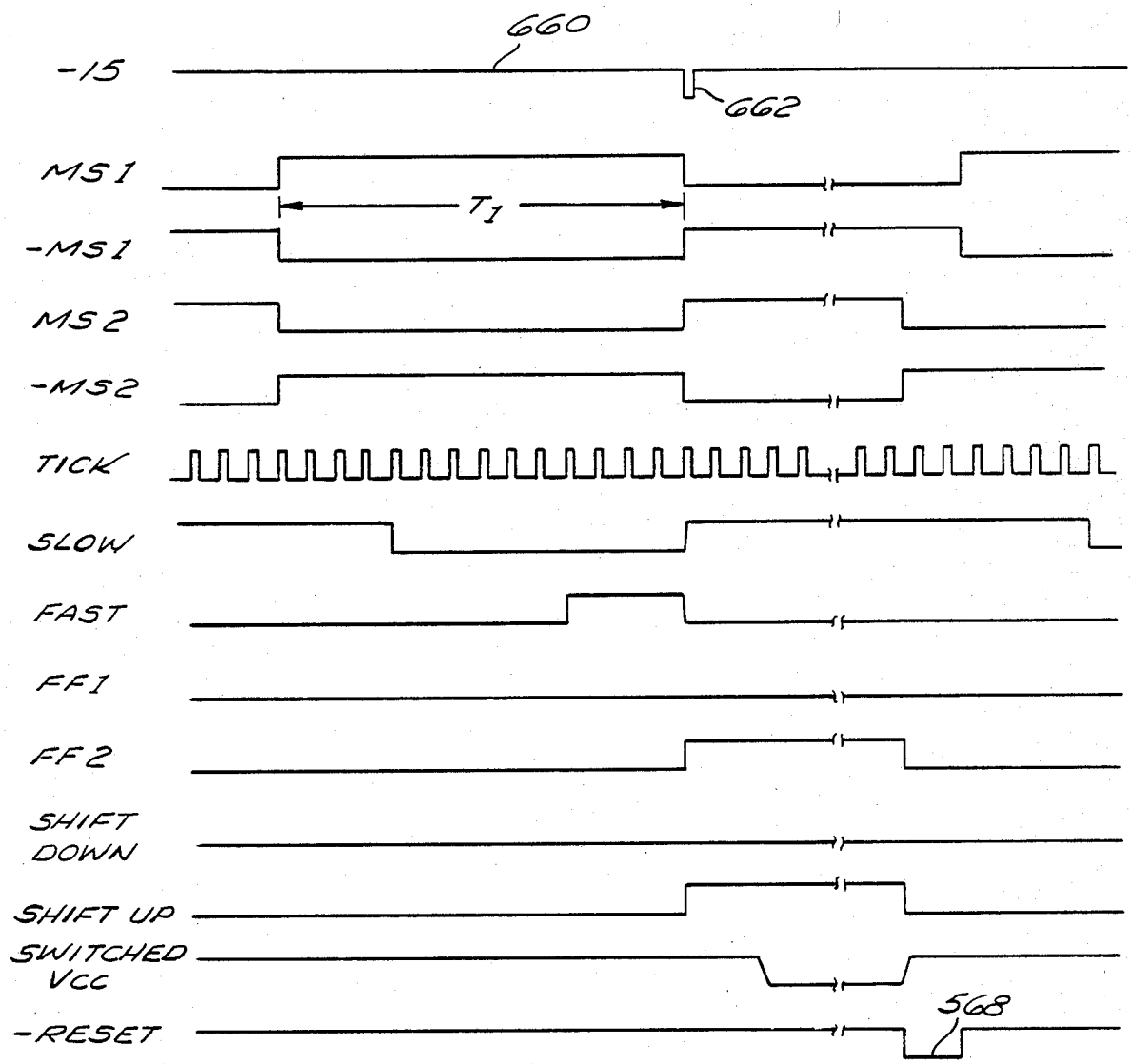
FIG. 35 is a set of timing diagrams representing the signals within the motor controller circuit which will occur when the wheel rotation rate is at or above the high end of the range of wheel rotation rates for the current gear. In this instance the electrical control circuit causes the motor to be operated to shift to a higher gear irrespective of whether the timing circuit has timed out.

The final mode of operation will be a time out, shift-up sequence in FIG. 35. This occurs when the MS1 pulse length T1 is too long and the speed of the wheel is too fast. Thus, the counter 526 output reaches state fifteen. Once state fifteen has been reached, the -15 output of the decoder 530 becomes active (as represented by a zero-going pulse 662 in a waveform 660 in FIG. 35). The -15 signal will cause the first monostable 522 to be reset through the OR-gate 582, thus causing the MS1 and -MS1 signals to terminate. Since the first monostable 522 is being reset, the flip-flops 532, 534 will be clocked and the data which is presently on the inputs will be latched in. Since the FAST signal on the line 550 is presently active and will be on the D-input of the second flip-flop 534 when the -MS1 signal on the line 542 is asserted, this will trigger a shift-up. The sequence is seen on the timing diagrams in FIG. 35, with the initial triggering of the sequence caused by the counter 526 reaching state fifteen rather than the timing out of the MS1 signal on the line 540 occurring when the counter 526 is in states eleven through fourteen. The rest of the time out shift-up sequence proceeds the same as for the shift-up sequence with the SWITCHED Vcc signal on line 412 being disabled during the gear change, and thereafter the -RESET signal 536 being activated to restart the timing cycle.

Although described above in connection with the disclosed circuit, it should be understood that the counting and timing functions disclosed herein can be performed by a microprocessor (not shown) that is programmable to provide a timing loop equivalent to the MS1 output of the first monostable 522 and a counting and coupling function equivalent to the functions of the counter 526 and the decoder 530. The microprocessor can generate the SHIFT-UP and SHIFT-DOWN signals to the motor drive circuit 404.

What is claimed is:

1. A sprocket assembly which is rotatable upon application of a force from a drive member which engages said sprocket assembly, said sprocket assembly being expandable so as to vary the mechanical advantage applied to said sprocket assembly, said sprocket assembly comprising:
    a first sprocket housing which is rotatable about a central axis, said first sprocket housing being oriented in a first plane which is substantially normal to said central axis;
    a second sprocket housing which is rotatable about said central axis, said second sprocket housing being stationary relative to said first sprocket housing and oriented in a second plane which is substantially parallel to said first plane;
    at least one sprocket segment mounted on each of said sprocket housings, said segments including means for engaging said drive member so that motion of said drive member is transmitted into rotation of said sprocket assembly about said central axis, each of said sprocket segments being movable relative to said respective housing in a substantially radial direction; and
    wherein said sprocket segment on said first housing and said sprocket segment on said second housing cooperate to define a variety of combined peripheral shapes so as to permit variation in the mechanical advantage applied to said sprocket assembly by said drive member.

2. The assembly of claim 1 wherein said sprocket segment on said first housing and an adjacent sprocket segment on said second sprocket segment overlap when oriented in a common radial position relative to said central axis, so that said drive member engaging means on both of said adjacent sprocket segments cooperate to simultaneously engage said drive member.

3. The assembly of claim 2, wherein said drive member comprises a chain formed from a plurality of links, and wherein said drive member engaging means comprises a plurality of teeth protruding radially outwardly from the periphery of each of said sprocket segments.

4. The assembly of claim wherein the combined periphery of said sprocket segments of said first and second sprocket housings form a substantially circular periphery throughout the entire range of radial positions of said sprocket segments.

5. The assembly of claim 1, further comprising means for selectively positioning said sprocket segments at a predetermined radial position.

6. The assembly of claim 5, wherein said radial positioning means comprises:
    a latch member pivotably secured to each of said sprocket segments;
    a catch member fixed to each of said sprocket housings, said latch member engaging said catch to prevent radial motion of said latch and sprocket segment relative to said sprocket housing;
    a pilot pin protruding axially from each of said latch members; and
    a shift actuator which is movable relative to said central axis in a plane substantially parallel to said first plane, said shift actuator causing radial displacement of said sprocket segments by contacting said pilot pins so as to disengage said latch from said catch member and drive said pilot pin in a radial direction a predetermined distance, at which point contact between said shift actuator and said pilot pin is terminated, permitting said latch member to reengage said catch member.

7. The assembly of claim 6, wherein said shift actuator is movable along a path such that contact between said pilot pin and said shift actuator occurs at a point of angular rotation of said sprocket assembly wherein said drive member is not in engagement with said sprocket segments, so as to minimize the force required to cause radial displacement of said sprocket segments and permit movement of said shift actuator while said sprocket assembly is stationary.

8. The assembly of claim 3, wherein each of said sprocket segments comprises a plurality of individual sprocket teeth, each tooth being hingedly fixed to an adjacent tooth so that each of said sprocket segments can form substantially circular arcs of varying radii, said teeth overlapping with teeth of adjacent sprocket segments so that pairs of adjacent teeth are effectively combined into a single tooth.

9. The assembly of claim 1, wherein said sprocket housings include a plurality of slots extending in a generally radial direction from said central axis, said sprocket segments each having a pin which extends into one of said slots so as to guide the radial motion of said sprocket segments relative to said sprocket housing.

10. The assembly of claim 8, wherein each of said sprocket segments is guided by at least one slot which is shaped as a circular arc.

11. The assembly of claim 8, wherein each of said sprocket housings further comprises:
    at least one backing plate, each of said backing plates being oriented in a plane substantially parallel to the plane of the respective sprocket housing, a plurality of slots being provided on said backing plates and extending in a generally radial direction; and at least one pin extending from each of said sprocket segments into one of said slots so as to guide the radial motion of said sprocket segments relative to said sprocket housings; and wherein said backing plate is angularly rotatable relative to said sprocket housing so that by the combination of radial and angular displacement of said sprocket segments, the effective total number of teeth on said sprocket assembly can be varied in desired increments.

12. The assembly of claim 1, wherein said sprocket assembly is mounted on the frame of a bicycle so as to cause rotation of a wheel on said bicycle, said drive member being driven by pedals on the bicycle, said sprocket assembly further comprising:
   a tubular sprocket axle about which said sprocket assembly is rotatable, one end of said sprocket axle being secured to said bicycle frame;
   a tubular wheel axle about which said wheel is rotatable, said wheel axle and said sprocket axle being coaxial, one end of said wheel axle being secured to said bicycle frame, the other end of said wheel axle being opposed to the other end of said sprocket axle;
   an elongate inner axle member extending through said wheel axle and through said sprocket axle, both ends of said inner axle member protruding outwardly from said wheel axle and said sprocket axle and fastened to said bicycle frame; and
   disengageable clutch means for transmitting force from said sprocket assembly to said wheel, wherein said elongate axle member maintains said wheel and said sprocket assembly oriented so that said clutch means is normally in an engaged position, withdrawal of said axle member from said wheel and sprocket axles permitting disengagement of said clutch means and removal of said from said bicycle frame, without requiring removal of said sprocket assembly.

13. A sprocket assembly which is rotatable upon application of force by a drive member which engages said sprocket assembly, said sprocket assembly being expandable so as to vary the mechanical advantage applied to said sprocket assembly by said drive member, said assembly comprising:
   a first sprocket housing which is rotatable about a central axis and oriented in a plane which is substantially normal to said central axis;
   a plurality of sprocket segments, each of said segments having a plurality of teeth for engaging said drive member so that motion of said drive member is transmitted to said sprocket segments, said sprocket segments being slidably mounted relative to said first sprocket housing so as to vary the combined peripheral dimension of said sprocket segments and thus the mechanical advantage applied to said sprocket assembly by said drive member;
   a plurality of backing plates on which each of said sprocket segments are slidably mounted, said backing plates being independently slidably mounted on said first sprocket housing such that angular displacement of said backing plates relative to said sprocket housing is permitted; and
   locator means for selectively determining the angular position of said backing plates relative to said first sprocket housing such that said teeth on said sprocket segments are properly oriented to mesh with said drive member throughout a variety of positions of said sprocket segments.

14. The assembly of claim 13, wherein each of said sprocket segments forms substantially circular arcs, and the combined peripheral shape of said sprocket segments is substantially circular.

15. The assembly of claim 13, wherein each of said sprocket segments further comprises a plurality of pins and said backing plates further comprise a plurality of slots, said pins being slidable within said slots in said backing plates in a substantially radial direction relative to said central axis 16. A sprocket assembly which is rotatable upon application of force by a drive member which engages said sprocket assembly, said sprocket assembly being expandable so as to vary the mechanical advantage applied to said sprocket assembly by said drive member, said assembly comprising:
   a first sprocket housing which is rotatable about a central axis and oriented in a plane which is substantially normal to said central axis;
   a plurality of sprocket segments having teeth for engaging said drive member so that motion of said drive member is transmitted to said sprocket segments, said sprocket segments being slidably mounted relative to said first sprocket housing so as to vary the combined peripheral dimension of said sprocket segments and thus the mechanical advantage applied to said sprocket assembly by said drive member;
   a plurality of backing plates on which each of said sprocket segments are slidably mounted, said backing plates being secured to said first sprocket housing such that angular displacement of said backing plates relative to said sprocket housing is permitted; and
   locator means for selectively determining the angular position of said backing plates relative to said first sprocket housing such that said teeth on said sprocket segments are properly oriented to mesh with said drive member throughout a variety of positions of said sprocket segments;
   a second sprocket housing oriented in a plane substantially parallel said first sprocket housing, said first and second sprocket housings being fixed relative to each other;
   at least one of said sprocket segments on said second sprocket housing;
   at least one of said backing plates movably mounted on said second sprocket housing so as to permit angular displacement of said backing plate relative to said second sprocket housing, said sprocket segments being slidably mounted on said backing plate; and
   locator means on said second sprocket housing for selectively determining the position of said backing plate relative to said second sprocket housing.

17. The assembly of claim 16, wherein adjacent sprocket segments on said first sprocket housing and said second sprocket housing overlap so that pairs of overlapping teeth on said adjacent segments are effectively combined to form a single tooth.

18. The assembly of claim 13, wherein said locator means comprises:
   a biasing member extending between said sprocket housing and said backing plate for biasing said backing plate in one angular direction;

a plurality of locator pins fixed to and protruding from said sprocket housing;

a polar locator mounted on a said backing plate and engageable with said locator pins so as to prevent further angular displacement of said backing plate in the direction of said biasing, said polar locator slidable relative to said backing plate, said locator bins being positioned so as to permit variations in the degree of angular displacement of said backing plate depending on the position of said polar locator.

19. The assembly of claim 18, wherein one of said polar locator is secured t each of said backing plates and is slidable therewith.

20. A sprocket assembly which is rotatable upon applicator of a force by a drive member which engages said sprocket assembly, said sprocket assembly being expandable so as to vary the mechanical advantage applied to said sprocket assembly by said drive member, said assembly comprising:

a first sprocket housing which is rotatable about a central axis, said sprocket housing being oriented in a plane which is substantially normal to said central axis;

at least one sprocket segment mounted on said sprocket housing, said segment including a plurality of teeth which are engageable with said drive member so that motion of said drive member is transmitted into rotation of said sprocket assembly about said central axis, each of said sprocket segments being movable relative to said housing so as to vary the mechanical advantage applied to said sprocket segments by said drive member; and wherein each of said sprocket segments is comprised of a plurality of subsegments, said subsegment being pivotally hinged about an axis parallel to said central axis together so that the shape of the periphery of each sprocket segment can be varied as needed to achieve a desired combined peripheral shape and dimension for all of said sprocket segments 21. A sprocket assembly which is rotatable upon applicator of a force by a drive member which engages said sprocket assembly, said sprocket assembly being expandable so as to vary the mechanical advantage applied to said sprocket assembly by said drive member said assembly comprising:

a first sprocket housing which is rotatable about a central axis, said first sprocket housing being oriented in a plane which is substantially normal to said central axis;

at least one sprocket segment mounted on said first sprocket housing, said segment including a plurality of teeth which are engageable with said drive member so that motion of sprocket assembly about said central axis, each of said sprocket segments being movable relative to said first housing so as to vary the mechanical advantage applied to said sprocket segments by said drive member, wherein each of said sprocket segments is comprised of a plurality of subsegments, said subsegments being pivotally hinged together so that the shape of the periphery of each sprocket segment can be varied as needed to achieve a desired combined peripheral shape and dimension for all of said sprocket segments;

a second sprocket housing which is also rotatable about said central axis, said second sprocket housing being stationary relative to said first sprocket housing and oriented in a second plane which is substantially parallel to said first sprocket housing;

at least one of said sprocket segments being mounted on said second sprocket housing and slidable relative thereto; and wherein said sprocket segments on said first housing and an adjacent sprocket segment on said second housing overlap, so that pairs of overlapping teeth on said adjacent sprocket segments are effectively combined to form a single tooth.

22. The assembly of claim 20, wherein each of said subsegments includes no more than one tooth.

23. The assembly of claim 20, wherein the periphery of each of said sprocket segments is shaped as a circular arc, and the combined peripheral shape of said sprocket segments is substantially circular.

24. The assembly of claim 23, further comprising:

a plurality of slots in said sprocket housings, said slots extending in a generally radial direction from said central axis; and at least one guide pin extending from each of said sprocket segments, said guide pins extending into said slots so as to guide the radial motion of said sprocket segments relative to said sprocket housing.

25. The assembly of claim 24, wherein each of said subsegments includes one of said guide pins.

26. A sprocket assembly which is rotatable upon application of a force by a drive member which engages said sprocket assembly, said sprocket assembly being expandable so as to vary the mechanical advantage applied to said sprocket assembly by said drive member, said assembly comprising:

a sprocket housing which is rotatable about a central axis, said sprocket housing being oriented in a plane which is substantially normal to said central axis;

at least one sprocket segment mounted on said sprocket housing, said segment including a plurality of teeth which are engageable with said drive member so that motion of said drive member is transmitted into rotation of said sprocket assembly about said central axis, each of said sprocket segments being movable relative to said housing so as to vary the mechanical advantage applied to said sprocket segments by said drive member, wherein each of said sprocket segments is comprised of a plurality of subsegments, said subsegments being pivotally hinged together so that the shape of the periphery of each sprocket segment can be varied as needed to achieve a desired combined peripheral shape and dimension for all of said sprocket segments and wherein the periphery of each of said sprocket segments is shaped as a circular arc, and the combined peripheral shape of said sprocket segments is substantially circular;

a plurality of slots in said sprocket housing, said slots extending in a generally radial direction from said central axis; and at least one guide pin extending from each of said sprocket segments, said guide pins extending into said slots so as to guide the radial motion of said sprocket segments relative to said sprocket housing, wherein at least one guide slot for each sprocket segment is shaped as a substantially circular arc.

27. The assembly of claim 26, wherein at least one guide slot for each sprocket segment is substantially linear and extends in a radial direction from said central axis.

28. The assembly of claim 27, wherein said arcuate guide slots are oriented symmetrically about said radial guide slot.

29. A sprocket assembly which is rotatable upon application of force by a drive member which engages said sprocket assembly, said sprocket assembly being expandable so as to vary the mechanical advantage applied to said sprocket assembly by said drive member, said assembly comprising:
- a sprocket housing which is rotatable about a central axis and oriented in a plane which is substantially normal to said central axis;
- a plurality of sprocket segments having means for engaging said drive member so that motion of said drive member is transmitted to said sprocket segments, said sprocket segments being slidably mounted relative to said sprocket housing so as to vary the combined peripheral dimension of said sprocket segments and thus the mechanical advantage applied to said sprocket assembly by said drive member;
- means for retaining said sprocket segments are desired locations relative to said sprocket housing, said retaining means being selectively disengageable so as to permit displacement of said sprocket segments to different locations;
- a shift actuator which is movable relative to said central axis, contact between retaining means and said shift actuator causing disengagement of said retaining means and displacement of said sprocket segments so as to cause said sprocket assembly of expand or contract; and
- shifter means for causing displacement of said shift actuator, said shift actuator remaining stationary during contact with said retaining means so that the force required to disengage said retaining means and cause displacement of said sprocket segments is generated by said drive member, thus reducing the force required to actuate said shifter means.

30. The assembly of claim 29, wherein said shift actuator is movable along a path such that contact between said shift actuator and said retaining means only occurs at a point of angular rotation of said sprocket assembly wherein said drive member is not in engagement with said sprocket segments, so as to minimize the force required to cause displacement of said sprocket segments, and to permit movement of said shift actuator while said sprocket assembly is stationary without adversely affecting the engagement between said sprocket segments and said drive member upon resuming rotation of said sprocket assembly.

31. A sprocket assembly which is rotatable upon application of force by a drive member which engages said sprocket assembly, said sprocket assembly being expandable so as to vary the mechanical advantage applied to said sprocket assembly by said drive member, said assembly comprising:
- a sprocket housing which is rotatable about a central axis and oriented in a plane which is substantially normal to said central axis;
- a plurality of sprocket segments having means for engaging said drive member so that motion of said drive member is transmitted to said sprocket segments, said sprocket segments being slidably mounted relative to said sprocket housing so as to vary the combined peripheral dimension of said sprocket and thus the mechanical advantages applied to said sprocket assembly by said drive member;
- means for retaining said sprocket segments at desired locations relative to said sprocket housing, said retaining means being selectively disengageable so as to permit displacement of said sprockets segments to different locations, said retaining means comprising:
  - a latch member pivotally secured to each of said sprocket segments;
  - a catch member fixed to said sprocket housing, said latch member engaging said catch to prevent radial motion of said latch and sprocket segments relative to said sprocket housing; and
  - a pilot pin protruding axially from each of said latch member said pilot pin contacting said shift actuator so as to disengage said latch from said catch member and drive said pilot pin so as to cause radial displacement of said sprocket segment a predetermined distance, at which point contact between said shift actuator and said pilot pin is terminating, permitting said latch member to re-engage said catch member;
- a shift actuator which is movable relative to said central axis, contact between said retaining means and said shift actuator causing disengagement of said retaining means and displacement of said sprocket segments so as to cause said sprocket assembly to expand or contract; and
- shifter means for causing displacement of said shift actuator, said shift actuator remaining stationary during contact with said retaining means so that the force required to disengage said retaining means and cause displacement of said sprocket segments is generated by said drive means, thus reducing the force required to actuate said shifter means.

32. The assembly of claim 31, wherein said latch member is biased into an engaged position with said catch member.

33. The assembly of claim 31, wherein said catch member comprises:
- a pair of racks each having a plurality of teeth, said racks being positioned on either side of slot in said sprocket housing along which said sprocket segment and latch member are slidable; and
- a tooth on either end of said latch member, said latch member teeth mating with said teeth on said rack members.

34. The assembly of claim 31, wherein said latch is pivotably secured to said sprocket segment about a hinge point, and wherein said pilot pin extends outwardly from said latch at a point spaced from said hinge point so that engagement between said shift actuator and said pilot pin causes rotation of said latch member about said hinge point.

35. A sprocket assembly which is rotatable upon application of force by a drive member which engages said sprocket assembly, said sprocket assembly being expandable so as to vary the mechanical advantage applied to said sprocket assembly by said drive member, said assembly comprising:
- a sprocket housing which is rotatable about a central axis and oriented in a plane which is substantially normal to said central axis;
- a plurality of sprocket segments having means for engagement said drive member so that motion of said drive member is transmitted to said sprocket segments, said sprocket segments being slidably mounted relative to said sprocket housing so as to vary the combined peripheral dimension of said sprocket segments and thus the mechanical advantage applied to said sprocket assembly by said drive member;

means for retaining said sprocket segments at desired locations relative to said sprocket housing, said retaining means being selectively disengageable so as to permit displacement of said sprocket segments to different locations;

a shift actuator which is movable relative to said central axis, contact between said retaining means and said shift actuator causing disengagement of said retaining means and displacement of said sprocket segments so as to cause said sprocket assembly to said expand of contract, said shift actuator further comprising:

a contact spring which contacts said retaining means and causes disengagement thereof, said contact spring being deflected upon contact with said retaining means in a direction so as to cause increased displacment of said sprocket segment; and wherein said contact spring returns to its original position so that upon continued rotation of said sprocket assembly, said shift actuator does not engage said retaining member unless said shift actuator is displaced by said shifter means; and shifter means for causing displacement of said shift actuator, said shift actuator remaining stationary during contact with said retaining means so that the force required to disengage said retaining means and cause displacement of said sprocket segments is generated by said drive means, thus reducing the force required to actuate said shifter means.

36. The assembly of claim 29, wherein said shifter means comprises:

a manually actuated lever;

a cable which is displaced upon movement of said lever; and a linkage for transmitting motion of said cable into a displacement of said shift actuator.

37. On a bicycle, a toothed sprocket assembly for transmitting force from a drive chain into rotation of a wheel on said bicycle, aid drive chain being driven by a front sprocket joined to a pedal crank, said sprocket assembly having multiple settings so that the overall diameter of the sprocket assembly and the number of teeth in engagement with said drive chain can be varied and so that the mechanical advantage applied to said wheel is variable, wherein said sprocket assembly (i) does not cause misalignment of said drive chain between said pedal sprocket and said sprocket assembly, (ii) enables the effective number of teeth on said sprocket to be varied in increments of one tooth, (iii) enables gear shifting when the drive chain is transmitting high loads, (iv) can be actuated while the bicycle is stationary, and (v) causes minimal chordal speed variation, said sprocket assembly comprising:

a first sprocket housing which is rotatable about a central axis, said first sprocket housing being oriented in a first plane which is substantially normal to said central axis;

a second sprocket housing which is rotatable about said central axis, said second sprocket housing being stationary relative to said first sprocket housing and oriented in a plane which is substantially parallel to said first sprocket housing;

at least one sprocket segment mounted on each of said sprocket housings, each of said sprocket segments including a plurality of radially outwardly protruding teeth which mate with said drive chain, said sprocket segments being slidable relative to said sprocket housing to vary the diameter and the combined peripheral shape of said sprocket segments;

at least one backing plate mounted on each of said sprocket housings, said sprocket segments being mounted on said backing plates, said backing plates including at least one guide slot therein, said sprocket segments being slidable along said guide slot in a substantially radial direction relative to said central axis, said backing plate being angularly rotatable relative to said sprocket housing, said sprocket segments on each sprocket housing overlapping with adjacent sprocket segments on the other sprocket housing so that pairs of adjacent teeth on said sprocket segments are effectively combined into a single tooth, angular displacement of said backing plates and radial displacement of said sprocket segments minimizing chordal variation and permitting the effective total number of teeth on said sprocket assembly to be varied in increments of one tooth; a latch member pivotably secured to each of said sprocket segments;

a catch member fixed to each of said sprocket housings, said latch member engaging said catch to prevent radial motion of said latch and sprocket segment relative to said sprocket housing;

a pilot pin protruding axially from each of said latch members;

a shift actuator which is movable relative to said central axis and contacts said pilot pin so as to disengage said latch from said catch member and drive said pilot pin in a radial direction a predetermined distance, at which point contact between said shift actuator and said pilot pin is terminated, permitting said latch member to re-engage said catch member, wherein contact between said pilot pin and said shift actuator occurs at a point of angular rotation of said sprocket assembly such that said drive chain is not in engagement with said sprocket segments being radially displaced, thus permitting movement of said shift actuator under high loads as well as when said sprocket assembly is stationary; and wherein each of said sprocket segments is comprised of a plurality of subsegments which are hinged to each other to permit the periphery of each sprocket segment to maintain the shape of a true circular arc of varying radii so that the combined periphery of said sprocket segments of said first and second sprocket housings form a substantially circular periphery through the entire range of radial positions of said sprocket segments.

38. The assembly of claim 29, wherein said shift actuator is movable in a plane which is substantially normal to said central axis.

* * * * *